United States Patent
Ohkawa et al.

(10) Patent No.: US 8,550,668 B2
(45) Date of Patent: Oct. 8, 2013

(54) LIGHT CONTROL MEMBER WITH INTERSECTING GROUPS OF PARALLEL PRISMS, AND LIGHT-EMITTING DEVICE USING SUCH MEMBER

(75) Inventors: Shingo Ohkawa, Saitama (JP); Atsushi Seki, Kanagawa (JP); Kotaro Shima, Kanagawa (JP)

(73) Assignee: Sony Corporation, Tokyo (JP)

( * ) Notice: Subject to any disclaimer, the term of this patent is extended or adjusted under 35 U.S.C. 154(b) by 353 days.

(21) Appl. No.: 12/685,427

(22) Filed: Jan. 11, 2010

(65) Prior Publication Data

US 2010/0177500 A1 Jul. 15, 2010

(30) Foreign Application Priority Data

Jan. 14, 2009 (JP) ................ P2009-006084

(51) Int. Cl.
*F21V 5/02* (2006.01)
*F21V 5/00* (2006.01)

(52) U.S. Cl.
CPC ............... *F21V 5/008* (2013.01); *F21V 5/005* (2013.01); *F21V 5/02* (2013.01)
USPC . 362/339; 362/223; 362/217.04; 362/311.06; 362/330

(58) Field of Classification Search
USPC ................. 362/606, 627, 223, 222, 217.02, 362/217.04, 244, 246, 249.02, 311.01, 311.02, 362/311.06, 330, 339
See application file for complete search history.

(56) References Cited

U.S. PATENT DOCUMENTS

| | | | | |
|---|---|---|---|---|
| 7,232,250 B2 * | 6/2007 | Chuang | ......................... | 362/620 |
| 7,753,565 B2 * | 7/2010 | Hsu et al. | ..................... | 362/339 |
| 7,862,192 B2 * | 1/2011 | Chang | .......................... | 362/97.3 |
| 2004/0174710 A1 * | 9/2004 | Gappelberg | .................. | 362/337 |
| 2005/0141844 A1 * | 6/2005 | Olczak | .......................... | 385/146 |
| 2006/0221592 A1 * | 10/2006 | Nada et al. | ...................... | 362/29 |
| 2006/0227554 A1 * | 10/2006 | Yu | ................................. | 362/294 |
| 2006/0285311 A1 * | 12/2006 | Chang et al. | .................... | 362/97 |
| 2007/0103908 A1 * | 5/2007 | Tabito et al. | .................. | 362/294 |
| 2007/0115573 A1 * | 5/2007 | Gueyvandov et al. | ........ | 359/883 |
| 2007/0195523 A1 * | 8/2007 | Chang | .......................... | 362/224 |

FOREIGN PATENT DOCUMENTS

| | | |
|---|---|---|
| JP | 2006-318886 | 11/2006 |
| JP | 2008-242269 | 10/2008 |

\* cited by examiner

*Primary Examiner* — Ismael Negron
(74) *Attorney, Agent, or Firm* — Finnegan, Henderson, Farabow, Garrett & Dunner, L.L.P.

(57) ABSTRACT

A light control member includes a plate-like member including a first flat surface and a second surface facing the first surface. The second surface has at least three prism line groups, each group including a plurality of substantially parallel linear prisms. Each one of the linear prisms of one prism line group intersects the linear prisms of other prism line groups at one intersection point, and each linear prism is formed into a convex shape having a substantially curved outer edge when viewed along its longitudinal direction.

10 Claims, 23 Drawing Sheets

LIGHT CONTROL MEMBER WITH INTERSECTING GROUPS OF PARALLEL PRISMS, AND LIGHT-EMITTING DEVICE USING SUCH MEMBER

BACKGROUND OF THE INVENTION

1. Field of the Invention

The present invention relates to a light control member, a light-emitting device, and a display device.

2. Description of the Related Art

A light-emitting device, which is an illuminator using a light source as a direct illumination and a back light illumination illuminating a back surface of a display panel, is used in a liquid crystal display device and the like. A light source part of the light-emitting device can be constituted by arranging a plurality of point light sources, such as a light emitting diode (hereinafter referred to as "LED"), in the form of a matrix or arranging a plurality of linear light sources in substantially parallel.

Especially when the light-emitting device is used in a display device, a light emitted from the light-emitting device is demanded to uniform the brightness of the entire display panel. Therefore, the light-emitting device is normally constituted so that the light-emitting device and the display panel are satisfactorily separated from each other and so that the light emitted from the light source enters into a light-diffusing plate to be diffused therein and thereafter to be emitted toward the display panel. However, recently, the display device tends to be reduced in thickness, and thus the distance between the light-emitting device and the display panel is reduced. Accordingly, even when the light emitted from the light source enters into the light-diffusing plate, the light may not be satisfactorily diffused, and therefore, the uniformity of the brightness of the display panel may be reduced.

With respect to the above problem, there has proposed a light control member provided for realizing the uniformity of the brightness of a light transmitting through a light-diffusing plate (for example, Japanese Patent Application Laid-Open Nos. 2008-242269 and 2006-318886). The Japanese Patent Application Laid-Open No. 2008-242269 discloses an optical sheet which has a multifaceted prism structure provided on the surface and enables emission of incident lights of different angles. The Japanese Patent Application Laid-Open No. 2006-318886 discloses a light control member with a groove for light control and a groove for light collection intersecting each other.

SUMMARY OF THE INVENTION

However, when LED is used as the light source of the light-emitting device, LED emits light so as to substantially elliptically diffuse the light based on the directional characteristics, and therefore, the nearer the center, the more brightly it is illuminated. Therefore, even if the light control members disclosed in the Japanese Patent Application Laid-Open Nos. 2008-242269 and 2006-318886 are used, there occurs such a phenomenon that the brightness of a portion corresponding to the center of LED is increased, and the brightness of a weak portion around the high brightness portion is reduced, whereby there is a problem that the uniformity of the brightness of the entire display panel is reduced.

In light of the foregoing, it is desirable to provide a new and improved light control member, which can enhance the uniformity of the brightness, a light-emitting device, and a display device.

According to an embodiment of the present invention, there is provided a light control member including a plate-like member including a first surface formed flat and a second surface facing the first surface and having at least three prism line groups constituted of a plurality of linear prisms arranged in substantially parallel. In the prism line group, each one of the linear prisms constituting each of the prism line groups intersect at one intersection, and the linear prism is formed into a convex shape having a substantially curved outer edge as viewed from the longitudinal direction.

According to the present invention, as viewed from the longitudinal direction of a linear prism constituting a prism line group, the linear prism is formed into a convex shape having a substantially curved outer edge. According to this constitution, regarding lights entering a first surface of the light control member, the number of the lights emitted from one linear prism formed on a second surface can be increased. The brightness distribution of the light emitted from the linear prism has such a symmetrical hanging bell-shaped curve that the brightness is highest at the center position where the linear prism projects the most, and the more distant from the center position, the brightness is reduced. The prism line groups constituted by arranging a plurality of the linear prisms in substantially parallel are intersected each other from three different directions, and consequently the brightness distribution of the light transmitting through the light control member can be totally uniformed.

Here, the linear prism has at least the four surfaces, which are connected so that the adjacent surfaces form an obtuse angle, and may be formed into a convex shape having a substantially curved outer edge as viewed from the longitudinal direction. Or, the linear prism may be formed into a convex shape having a curved outer edge as viewed from the longitudinal direction.

The prism line groups may extend in each direction obtained by equiangularly dividing the circumference centering on the intersection.

Moreover, in the linear prism, when the outer edge of the linear prism is sectioned at an arbitrary interval in a direction vertical to the first surface, the more distant from a center position where the linear prism projects the most, the number of beams per a unit area in each of the sections is reduced. That is, in the linear prism, the more distant from the center position, the smaller the number of beams $F_n/S_n$ per a unit area in each of the sections, and $$S_n = ((L_{n+1}-L_n)/2)^2 - ((L_n-L_{n-1})/2)^2 \qquad (1)$$

$$F_n = B_n \times \cos\theta_n I(\theta_n) \times T(\theta_n) \qquad (2),$$

wherein $B_n$ is a virtual area that is really visually confirmed, $\theta_n$ is an incident angle for emitting light toward a direction of a normal line of the second surface, $I(\theta_n)$ is the light intensity of the light source at $\theta_n$, $T(\theta_n)$ is the light transmittance of the light control member at $\theta_n$, $L_n = \tan\theta_n$, $L_1 - L_0 = 0$, and n is an integer.

According to another embodiment of the present invention, there is provided a light-emitting device including a light source emitting light, and a light control member which diffuses light emitted from the light source. The light control member is constituted of a plate-like member including a first surface formed flat and a second surface having at least three prism line groups constituted of a plurality of linear prisms arranged in substantially parallel. In the prism line group, each one of the linear prisms constituting each of the prism line groups intersect at one intersection, and the linear prism is formed into a convex shape having a substantially curved outer edge as viewed from the longitudinal direction.

Here, the light source may be constituted of a plurality of point light sources arranged in a lattice pattern with a predetermined interval. The point light source may emit light in a direction substantially vertical to the light control member. Moreover, the light-emitting device may include an air layer is provided between the light source and the light control member.

According to another embodiment of the present invention, there is provided a display device including a display panel on which an image is displayed, and a light-emitting device illuminating the display panel from the back surface. Here, the light-emitting device includes a light source emitting light and a light control member which diffuses the light emitted from the light source. And, the light control member is constituted of a plate-like member including a first surface formed flat and a second surface having at least three prism line groups constituted of a plurality of linear prisms arranged in substantially parallel. In the prism line group, each one of the linear prisms constituting each of the prism line groups intersect at one intersection, and the linear prism is formed into a convex shape having a substantially curved outer edge as viewed from the longitudinal direction.

As described above, according to the present invention, there is provided a light control member, which can enhance the uniformity of brightness, a light-emitting device, and a display device.

DETAILED DESCRIPTION OF THE EMBODIMENTS

Figure 1:
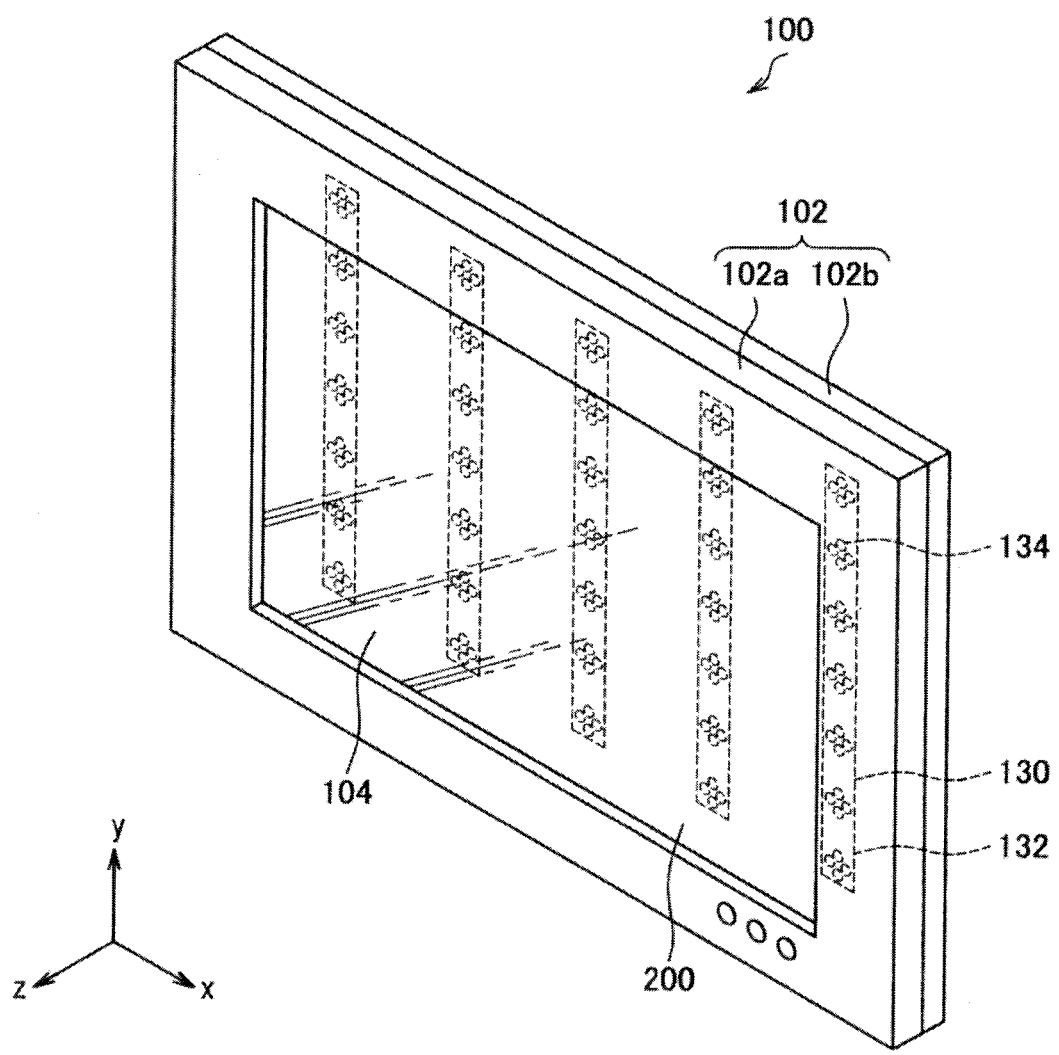
FIG. 1 is a perspective view showing a constitution of a display device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description is given in the following order:
1. Constitution of display device;
2. Constitution of light-diffusing plate; and
3. Simulation (simulation condition and simulation result)

<1. Constitution of Display Device>

Figure 2:
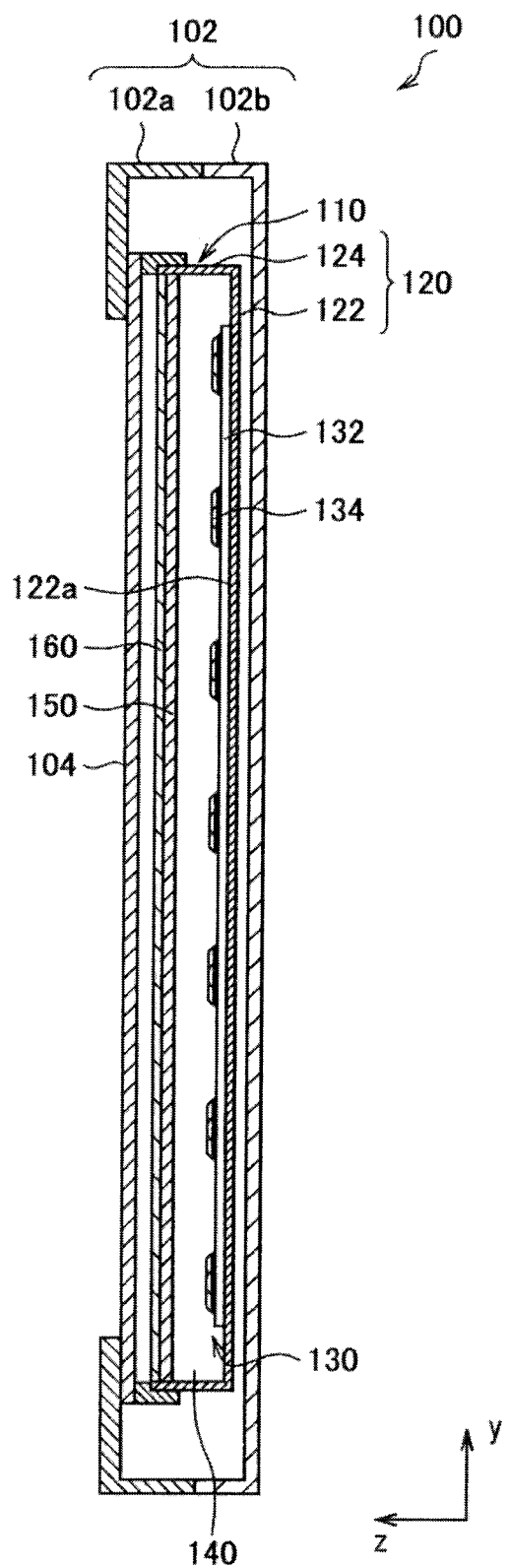
FIG. 2 is a cross-sectional view showing the display device according to the first embodiment.

First, a constitution of a display device 100 with a light-diffusing plate 150, which is a light control member according to a first embodiment of the present invention, is described based on FIGS. 1 and 2. FIG. 1 is a perspective view showing a constitution of the display device 100 according to the present embodiment. FIG. 2 is a cross-sectional view showing the display device 100 according to the present embodiment The display device 100 according to the present embodiment is a liquid crystal display device used as a display part of a television receiver and a personal computer, for example. The display device 100, as shown in FIGS. 1 and 2, is constituted of an outer case 102, a display panel 104, and a backlight unit 110 as a light-emitting device provided in the outer case 102.

The outer case 102 supports the display panel 104 and is a member containing the backlight unit 110. The outer case 102 is formed by bonding a front panel 102a and a rear panel 102b. The front panel 102a has an opening penetrating in a z axis direction, and the display panel 104 is provided so as to close the opening.

The display panel 104 displays images thereon and, for example, is constituted of a transmissive color liquid crystal panel and two polarization plates holding the panel from the front and back sides. The display panel 104 is driven by an active matrix system to display full color images.

The outer case 102 includes, as shown in FIG. 2, the backlight unit 110 as the light-emitting device illuminating the display panel 104 from the back surface side (the surface on the z axis negative direction side). The backlight unit 110 is constituted of a housing 120, a light-emitting unit 130, the light-diffusing plate 150, and an optical sheet 160.

The housing 120 contains the light-emitting unit 130 and supports the light-diffusing plate 150 and the optical sheet 160. The housing 120 is constituted of a flat portion 122 facing the display panel 104 and a peripheral surface 124 projecting from the periphery of the flat portion 122 substantially vertical (in the z axis positive direction) to the flat portion 122. The flat portion 122 surrounded by the peripheral surface 124 contains the light-emitting unit 130. The inside of the peripheral surface 124 is in contact with the terminal edges of the light-diffusing plate 150 and the optical sheet 160 to support the light-diffusing plate 150 and the optical sheet 160. The flat portion 122 of the housing 120 and the light-diffusing plate 150 has an air layer 140 provided therebetween.

The light-emitting unit 130 has a circuit board 132 and a light source 134 and emits light toward the display panel 104 side. The circuit board 132 is provided on the flat portion 122 of the housing 120 and mounts a light emission control circuit (not shown) for controlling emission of the light source 134. For example, LED can be used as the light source 134. In the backlight unit 110 according to the present embodiment, as shown in FIG. 1, a plurality of the light sources 134 are arranged so as to be isolated from each other in the up, down, left, and right directions (x axis direction and y axis direction) at a predetermined interval. For example, the light source 134 is constituted of four LEDs including one red LED, two green LEDs, and one blue LED.

The light-diffusing plate 150 is a plate-like light control member diffusing light and is formed of a material such as acrylic. The light-diffusing plate 150 is supported by the peripheral surface 124 of the housing 120 so as to face the light source 134. The light-diffusing plate 150 diffuses the light emitted from the light source 134. According to this constitution, the light passing through the light-diffusing plate 150 is diffused to enter the display panel 104, and the variation of the brightness in the display panel 104 can be reduced. The detailed constitution of the light-diffusing plate 150 will be described later.

The optical sheet 160 controls, for example, the traveling direction of the light emitted from the light source 134. The optical sheet 160 is constituted of a laminate of sheets having a predetermined optical function such as a prism sheet, which deflects the light emitted from the light source 134 to guide the light in a predetermined direction, and a polarization direction conversion sheet converting the polarization direction. The optical sheet 160 is provided on the light-diffusing plate 150 so as to face the display panel 104.

In the display device 100, the display panel 104 displays images, and the light emission control circuit controls the emission of the light source 134 to allow the light source 134 to emit light. The light emitted from the light source 134 travels substantially straight through the air layer 140 to enter the light-diffusing plate 150. The light entering the light-diffusing plate 150 is diffused in the light-diffusing plate 150, and the diffused light is then refracted by the optical sheet 160, or the polarization direction is converted. Thereafter, the light illuminates the back surface of the display panel 104.

The constitution of the display device 100 according to the present embodiment has been described. In the display device 100, a plurality of LEDs arranged at a predetermined interval are used as the light sources 134. Based on the directional characteristics of LED, the nearer the center of the LED, the more brightly it is illuminated. Therefore, it is demanded to satisfactorily diffuse light to such an extent that the display panel 104 is illuminated and to reduce the variation of the brightness in the display panel 104. Thus, the display device 100 according to the present embodiment includes the light-diffusing plate 150 further diffusing light and constituted so that the brightness of the emitted light is totally substantially uniformed.

Figure 3:
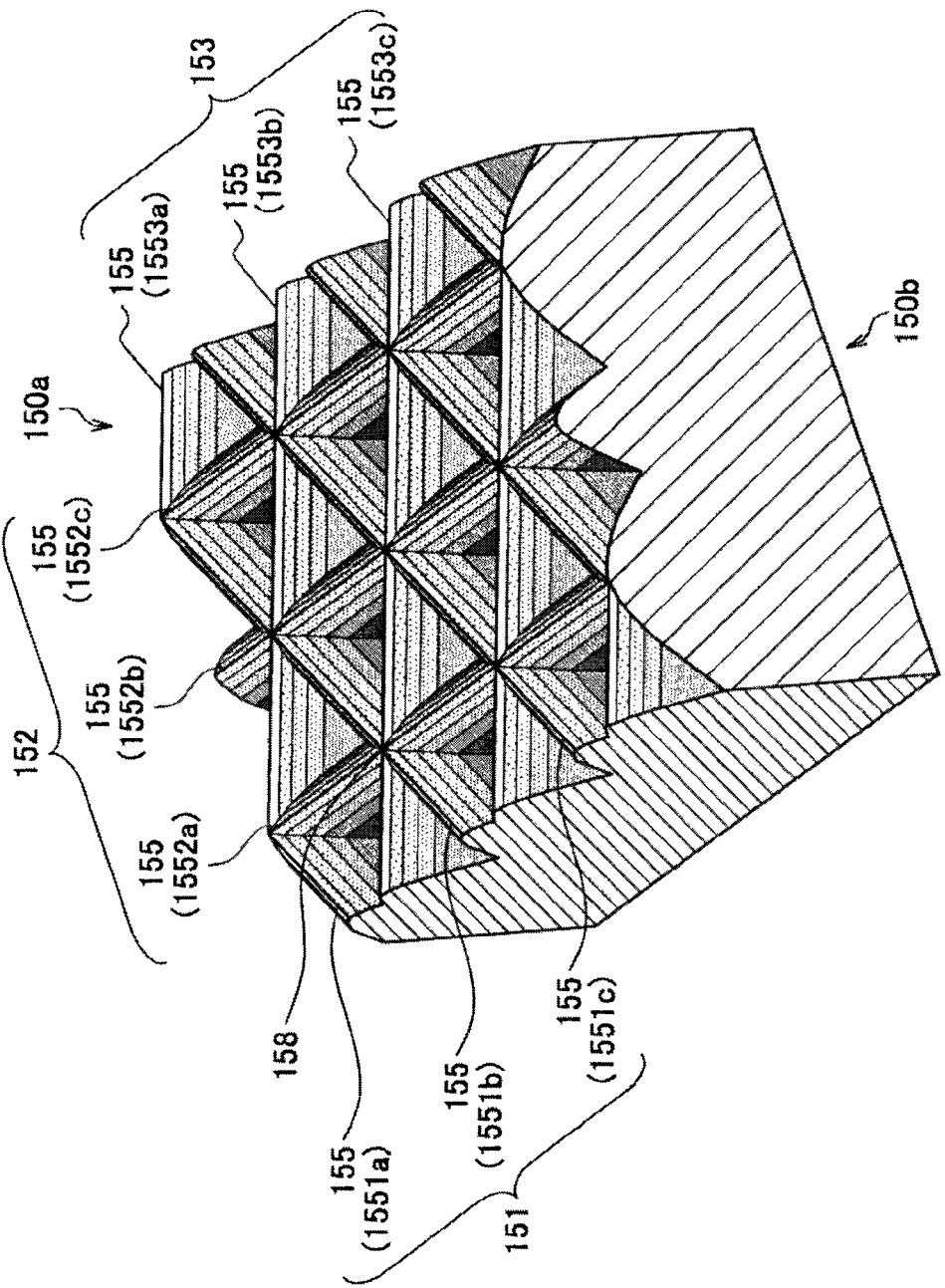
FIG. 3 is a partially perspective view showing a constitution of a light-diffusing plate according to the first embodiment.
Figure 4:
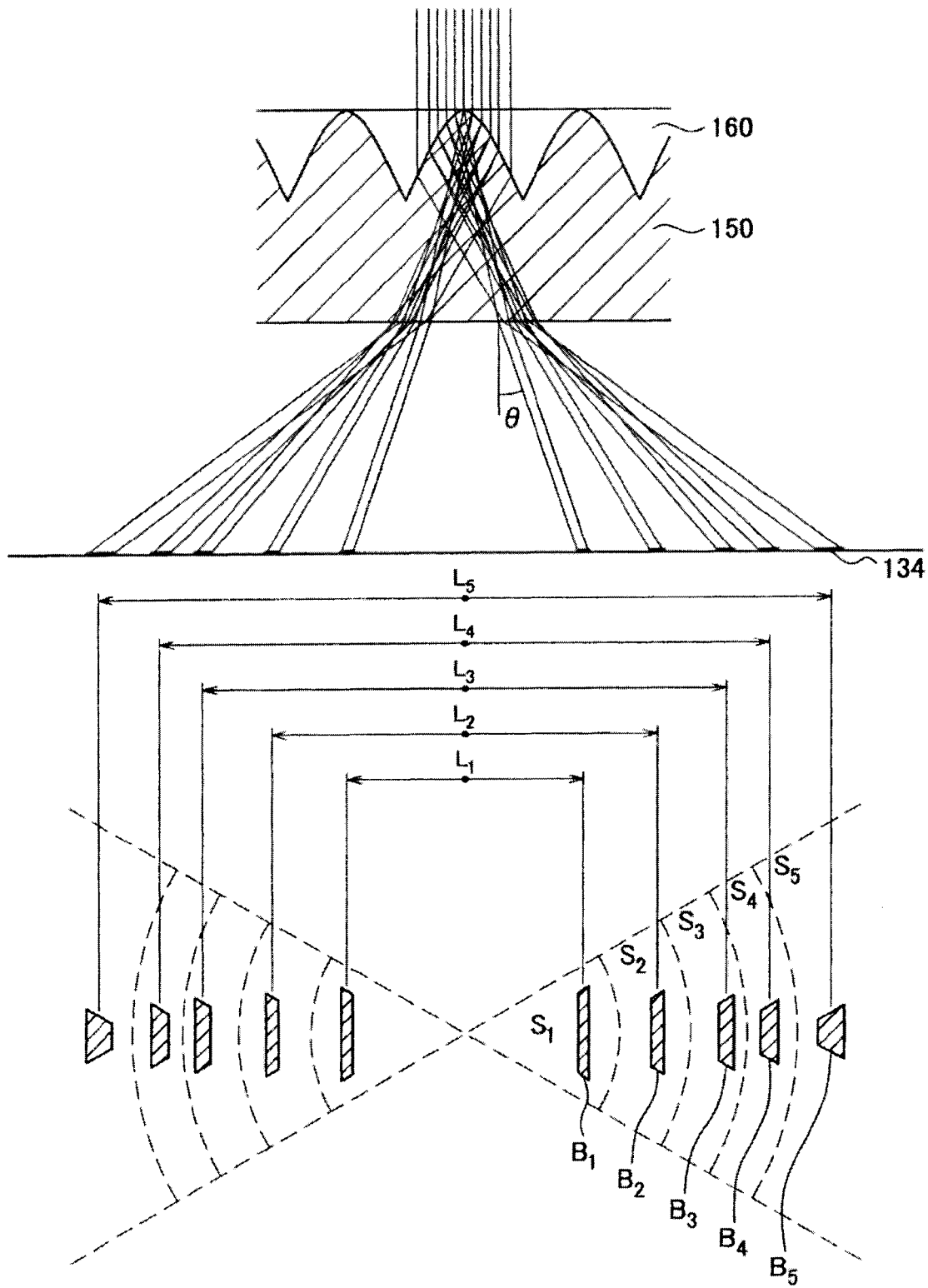
FIG. 4 is an explanatory view for explaining the shape and characteristics of the light-diffusing plate according to the first embodiment.
Figure 5:
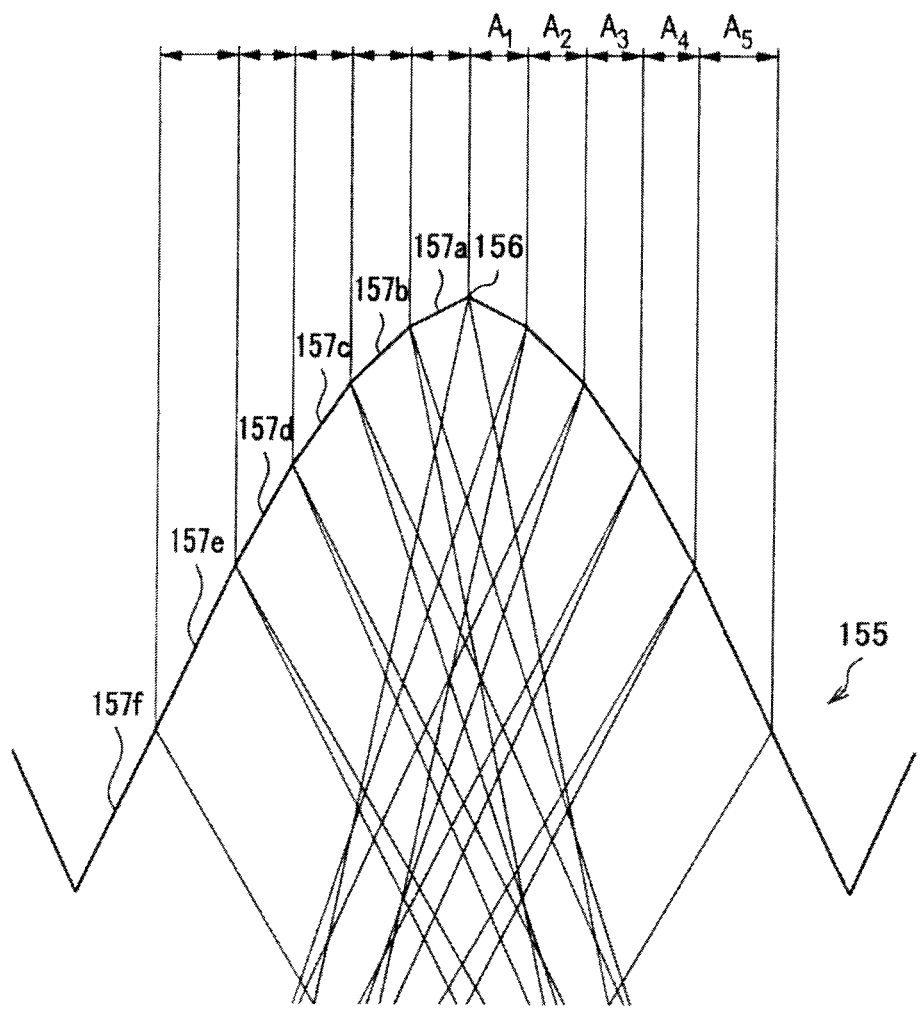
FIG. 5 is a partially enlarged view of the light-diffusing plate according to the first embodiment.
Figure 6:
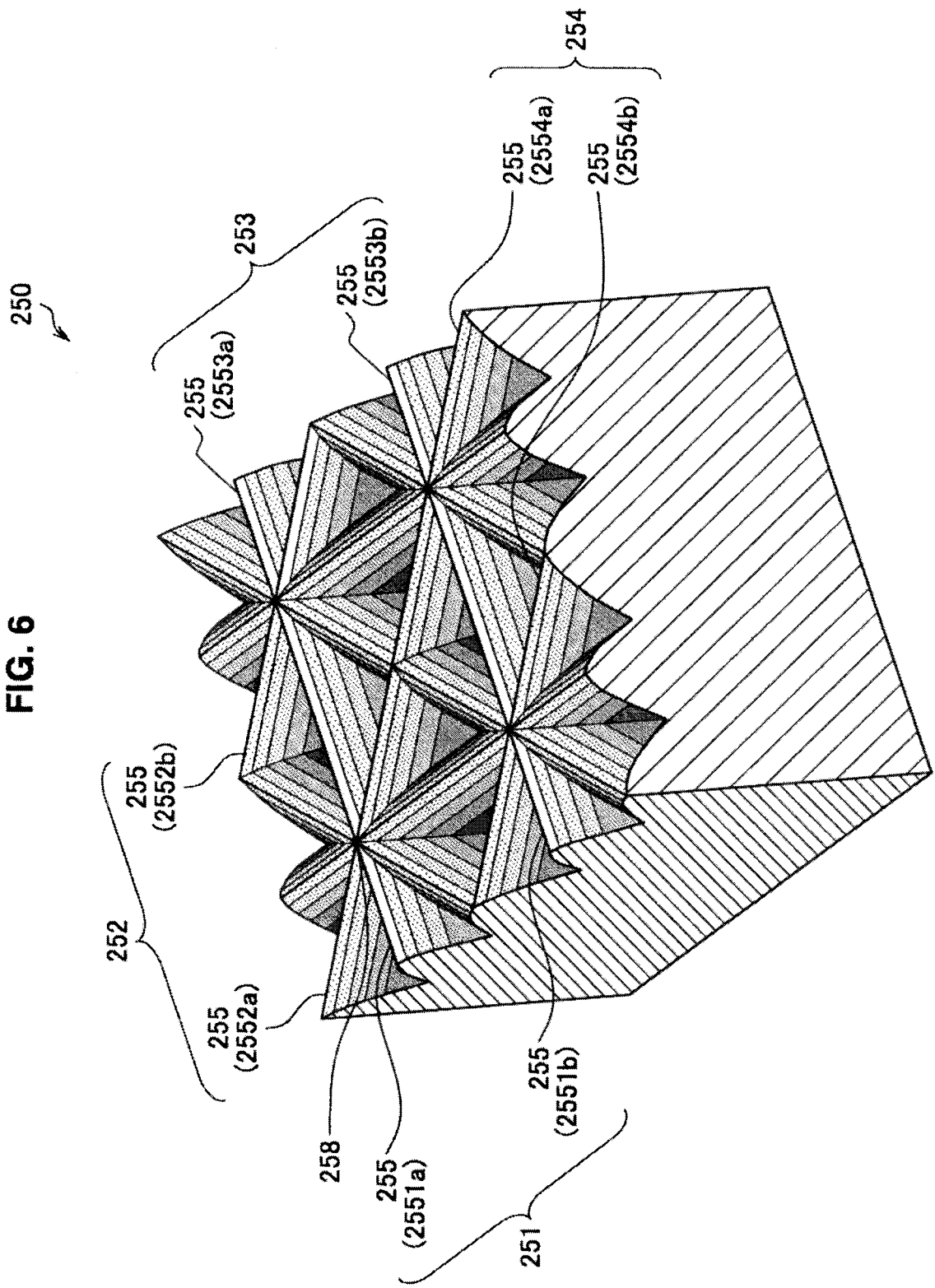
FIG. 6 is a partially perspective view showing another example of the light-diffusing plate according to the first embodiment.

Hereinafter, based on FIGS. 3 to 6, a constitution of the light-diffusing plate 150 according to the present embodiment is described in detail. FIG. 3 is a partially perspective view showing the constitution of the light-diffusing plate 150 according to the present embodiment. FIG. 4 is an explanatory view for explaining the shape and characteristics of the light-diffusing plate 150 according to the present embodiment. FIG. 5 is a partially enlarged view of the light-diffusing plate 150 according to the present embodiment. FIG. 6 is a partially perspective view showing another example of the light-diffusing plate according to the present embodiment.

<2. Constitution of Light-Diffusing Plate>

The light-diffusing plate 150 according to the present embodiment is a plate-like member formed of acrylic, for example, and has a concavoconvex shape, shown in FIG. 3, on the surface facing the display panel 104 (hereinafter referred to as a "front surface 150a"). The back surface 150b of the light-diffusing plate 150 is formed evenly. The concavoconvex shape of the front surface 150a of the light-diffusing plate 150 is constituted of a combination of three prism line groups 151, 152, and 153. The prism line groups 151, 152, and 153 are each constituted of a plurality of linear prisms 155 arranged in parallel. For example, the first prism line group 151 is constituted of linear prisms 1551a, 1551b, 1551c, and . . . arranged in parallel at a predetermined interval. Likewise, the second prism line group 152 is constituted of linear prisms 1552a, 1552b, 1552c, and . . . arranged in parallel at a predetermined interval, and the third prism line group 153 is constituted of linear prisms 1553a, 1553b, 1553c, and . . . arranged in parallel at a predetermined interval.

In each of the prism line groups 151, 152, and 153, the arrangement interval of the linear prisms 155 is the same, and the interval of the ridge lines of the adjacent linear prisms 155 can be set to about 100 μm. The three linear prisms 155 arbitrarily selected one from each of the prism line groups 151, 152, and 153 intersect at one intersection 158. As viewed from the intersection 158 of the linear prisms 155, the linear prism 155 is constituted so as to extend in three directions obtained by dividing the circumference, centering on the intersection 158, at a predetermined angle. In the present embodiment, the extending direction of the linear prism 155 may be a direction obtained by equiangularly dividing the circumference centering on the intersection 158 (namely, 60°).

The linear prism 155, as shown in FIG. 5, has a multifaceted shape with cross sections obtained by cut vertically with respect to the longitudinal direction and projecting toward the front surface 150a side. In the linear prism 155 according to the present embodiment, six surfaces 157a to 157f are provided symmetrically with respect to the vertical line dropped from a most projecting position 156 to the rear surface 150b. The surfaces 157a to 157f are connected so that the angle formed by the adjacent surfaces is an obtuse angle ($\pi/2 < \theta < \pi$) and forms a convex shape having a substantially curved outer edge as viewed from the longitudinal direction. At that time, the convex shape is formed into a sharper curved surface shape, and consequently light can be further diffused. The prism line groups 151, 152, and 153 constituted by arranging the linear prisms 155 are intersected, whereby recesses each having a substantially triangular pyramid shape, shown in FIG. 3, are formed, and the concavoconvex shape is formed on the front surface 150a.

The light travelling in the display device 100 is described. As shown in FIG. 4, the light emitted from the light source 134 of the backlight unit 110 travels straight through the air layer 140 to enter the rear surface 150b of the light-diffusing plate 150 at an incident angle θ. The light entering the light-diffusing plate 150 is refracted to be emitted from the surface of the linear prism 155 formed on the front surface 150a, and, thus, to be refracted by the optical sheet 160 so as to travel in the same direction. The light emitted from the optical sheet 160 illuminates the back surface of the display panel 104.

When the light from the light source 134 travels, as the backlight unit 110 is viewed from the front surface side of the optical sheet 160 (the side of the surface from which the light from the light source 134 is emitted), the light sources 134, which emit lights to be emitted from the surfaces 157a to 157f of the linear prism 155, are seen. Thus, when one linear prism 155 has 12 surfaces, lights emitted from 12 light sources 134 are emitted from the one linear prism 155 to illuminate the display panel 104. The number of the surfaces constituting the convex shape of the linear prism 155 is increased, and consequently the lights emitted from the larger number of the light sources 134 can be emitted from the linear prism 155.

In the linear prism 155 having the above constitution according to the present embodiment, the most projecting center position 156 has the highest brightness, and the more distant from the center position 156, and the closer to the both sides, the brightness is reduced. Namely, a graph showing the brightness of the light emitted from the linear prism 155 is a symmetrical hanging bell-shaped curve. According to this constitution, with regard to the light emitted from one linear prism, the light is emitted so that the brightness at the center position 156 is highest, and so that the more distant from the center position 156, the brightness is gradually reduced. At the position far from the center position 156, the lights emitted from the adjacent linear prisms 155 overlap each other, whereby the light with totally uniformed brightness is emitted from the backlight unit 110.

In other words, in the linear prism 155, the number of beams per a unit assignment area corresponding to each of the surfaces 157a to 157f constituting the linear prism 155 is the largest at the center position 156, and the more distant from the center position 156, the number of beams is reduced. The number of beams per the unit assignment area is represented by $F_n/S_n$, wherein $S_n$ is a region (hereinafter referred to as a "assignment region $S_n$") to be illuminated by the light emitted from each of the surfaces 157a to 157f constituting the linear prism 155, and $F_n$ is the number of beams (hereinafter referred to as an "expected beam $F_n$") passing through the assignment region $S_n$. n is an integer and 1, 2, 3, and ... in the order closest to the center position 156. $S_n$ and $F_n$ are represented by the following formulae (1) and (2):

$$S_n = ((L_{n+1} - L_n)/2)^2 - ((L_n - L_{n-1})/2)^2 \tag{1}$$

$$F_n = B_n \times \cos\theta_n \times I(\theta_n) \times T(\theta_n) \tag{2}$$

wherein $B_n$ is a virtual area, $\theta_n$ is an incident angle for emission toward a direction of a normal line of the light-emitting surface, $I(\theta_n)$ is the light intensity of the light source 134 at $\theta_n$, and $T(\theta_n)$ is the light transmittance of the light-diffusing plate 150 at $\theta_n$. At that time, $L_n = \tan\theta_n$, and $L_1 - L_0 = 0$. The virtual area $B_n$ is the area of the region, which is seen shining actually as viewed in the vertical direction from the side of the front surface 150a of the light-diffusing plate 150, relative to the assignment region $S_n$.

In the present embodiment, the three prism line groups 151, 152, and 153 form 60° and intersect in three directions, and therefore, the assignment region Sn assigning illumination to one linear prism 155 has, as shown in FIG. 4, a fan-like shape or a circular arc shape having a center angle of 60°. The linear prism 155 is formed so that as the expected beam Fn passing through the assignment region Sn approaches nearer the center position 156, the number of the linear prisms 155 is increased. According to this constitution, it is possible to form such a symmetrical hanging bell-shaped brightness distribution that the center position 156 is most bright, and that the more distant from the center position 156, it becomes gradually dark.

The constitution of the light-diffusing plate 150 according to the present embodiment has been described. The light-diffusing plate 150 according to the present embodiment, as shown in FIG. 3, has the concavoconvex shape on the front surface 150a, and the concavoconvex shape is formed by intersecting the three prism line groups 151, 152, and 153, which are constituted by arranging in parallel the linear prisms 155 each formed into a substantially curved surface. The concavoconvex shape is formed so that each one of the linear prisms 155, constituting each of the prism line groups 151, 152, and 153, intersect at one intersection 158 at which the linear prisms 155 intersect each other. According to this constitution, by virtue of the high diffusion effect of each of the linear prisms 155 and overlap of the light, emitted from the surface far from the center position 156, with the light emitted from the adjacent linear prism 155, the brightness of the light emitted from the backlight unit 110 can be uniformed.

The shape of the light-diffusing plate is not limited to the shape of the light-diffusing plate 150 according to the present embodiment shown in FIG. 3. The linear prisms of the light-diffusing plate may have two or more surfaces (157a and 157b) on the both sides from the center of the cross-sectional shape vertical to the longitudinal direction, that is, may have four or more surfaces. Three or more prism line groups may be provided.

For example, as shown in FIG. 6, a light-diffusing plate 250 may be used. The light-diffusing plate 250 has four prism line groups constituted by arranging a plurality of linear prisms 258 in parallel at even intervals. The linear prism 255 shown in FIG. 6 can have the same shape as the shape of the linear prism 155 of FIG. 3. In the light-diffusing plate 250, each one of the linear prisms 255 constituting each of prism line groups 251, 252, 253, and 254 intersect at one intersection 258 at which the linear prisms 255 intersect each other. Namely, the linear prisms 255 extend in four directions from one intersection 258. According to this shape of the linear prism, by virtue of the high diffusion effect of each of the linear prisms 255 and overlap of the light, emitted from the surface far from the center position, with the light emitted from the adjacent linear prism 255, the brightness of the light emitted from the backlight unit 110 can be uniformed. In FIG. 6, each extending direction of the linear prisms 255 respectively constituting the prism line groups 251, 252, 253, and 254 may be a direction obtained by equiangularly dividing the circumference centering on the intersection 258 (namely, 45°).

<3. Simulation>

[Simulation Conditions]

The light diffusion effects of the light-diffusing plates 150 and 250 according to the present embodiment and the light-diffusion effects of the related art light-diffusing plates 10, 20, 30, and 40 are simulated, and the effects of the light-diffusing plates 150 and 250 according to the present embodiment are verified. Hereinafter, the simulation conditions and the simulation results are described based on FIGS. 7 to 17C.

Figure 11:
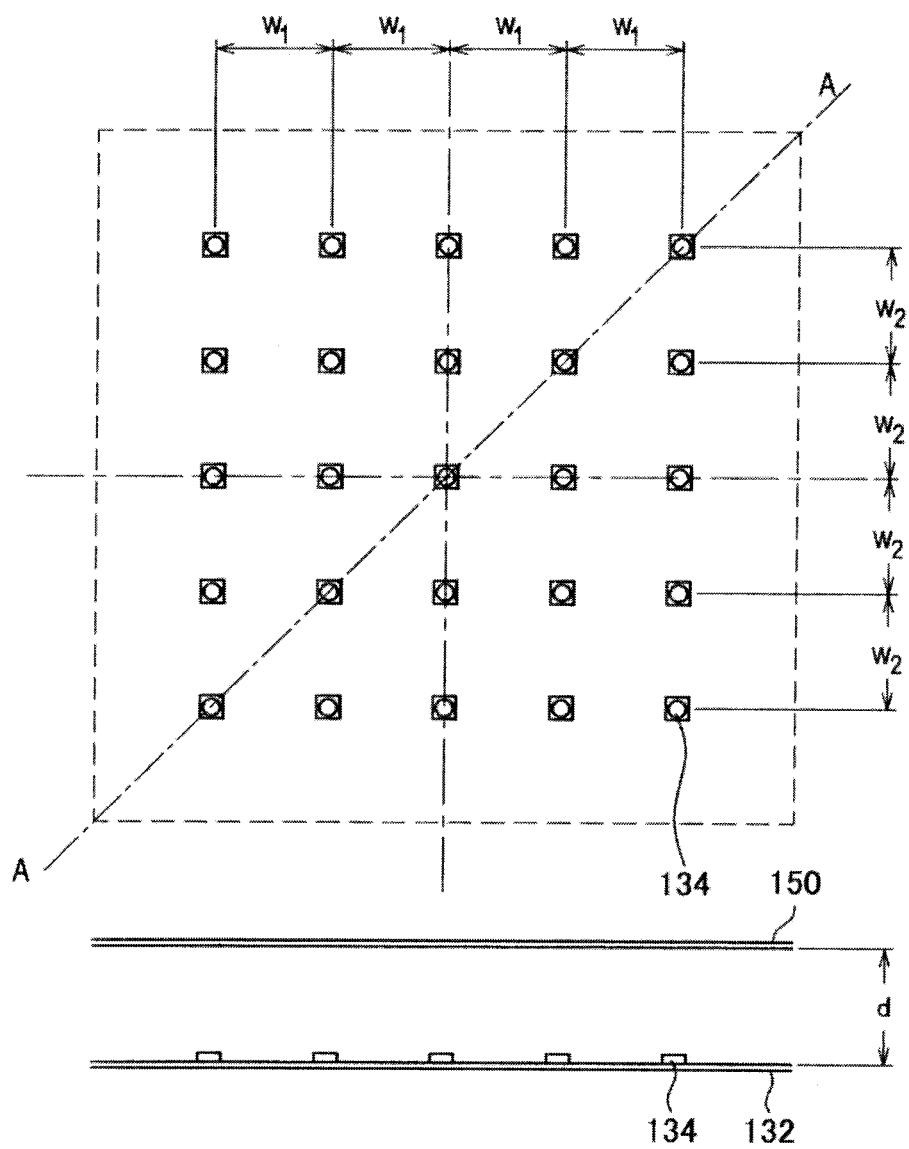
FIG. 11 is an explanatory view for explaining simulation conditions.
Figure 12A:
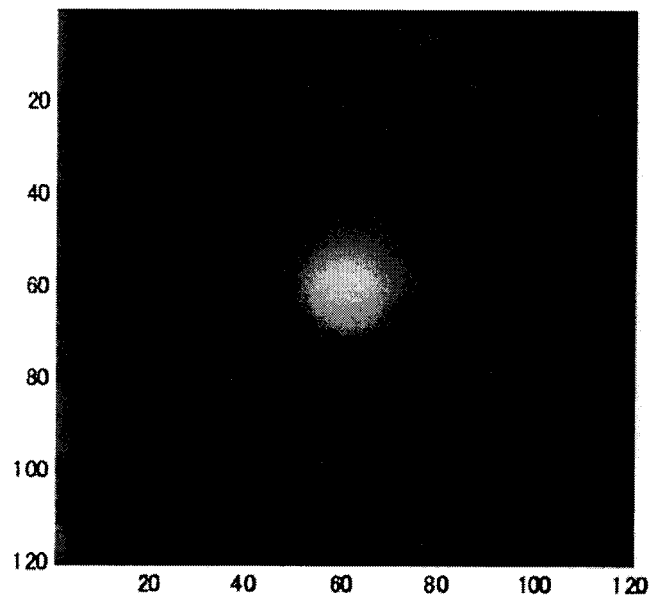
FIG. 12A is an image showing a simulation result showing a light diffusing state in the light-diffusing plate of FIG. 3 when a light source has one light.
Figure 12B:
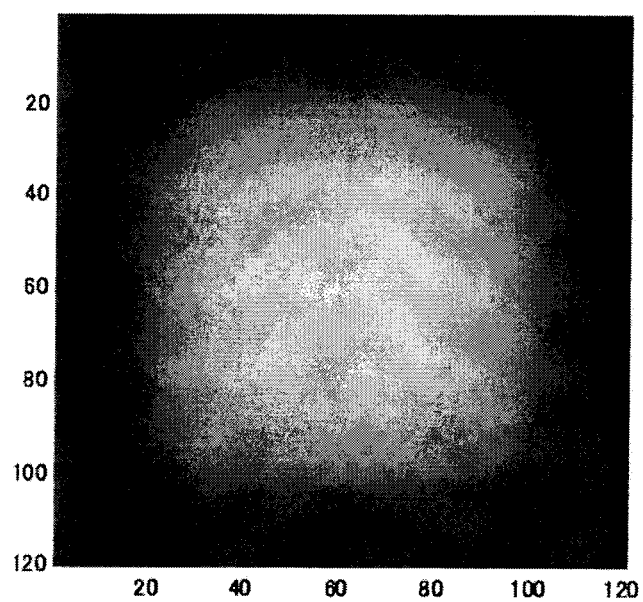
FIG. 12B is an image showing a simulation result showing a light diffusing state in the light-diffusing plate of FIG. 3 when the light source has 25 lights.
Figure 12C:
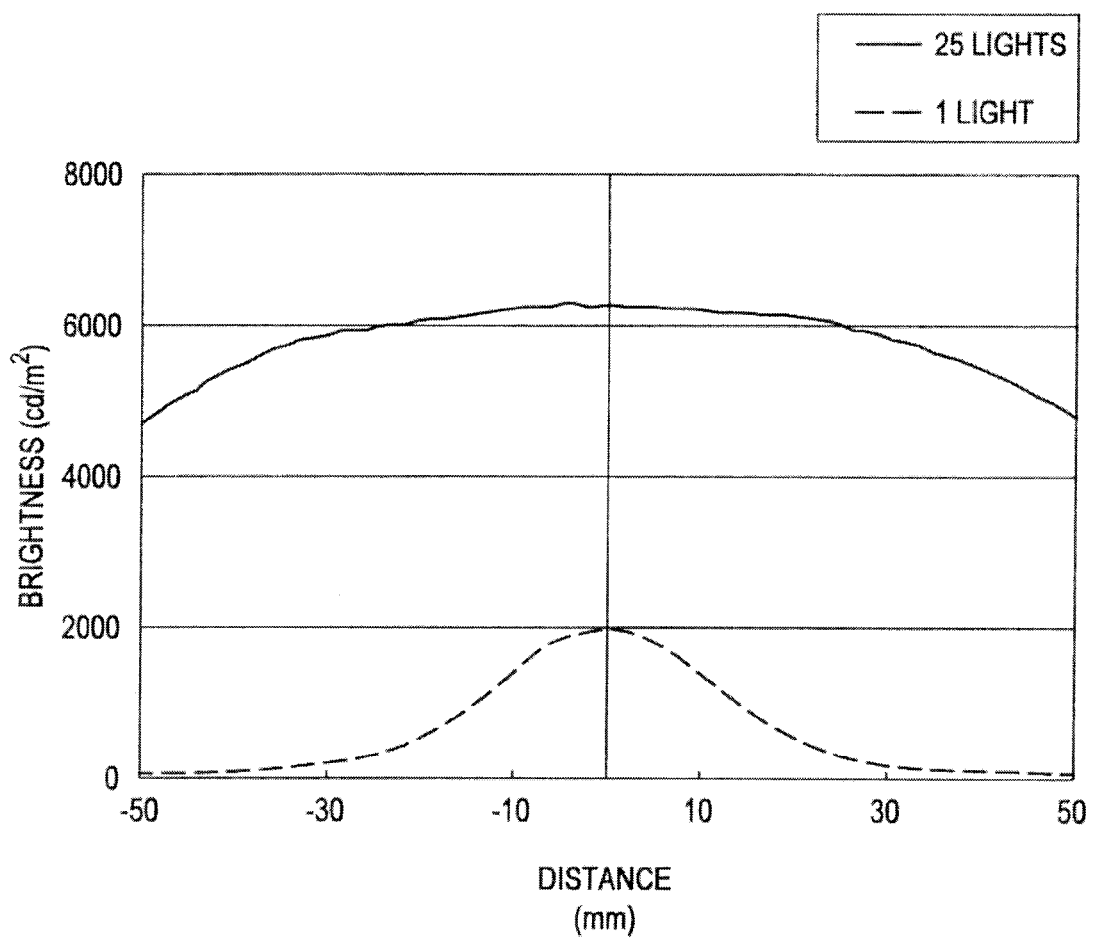
FIG. 12C is a graph showing a simulation result of brightness distribution in the light-diffusing plate of FIG. 3.
Figure 13A:
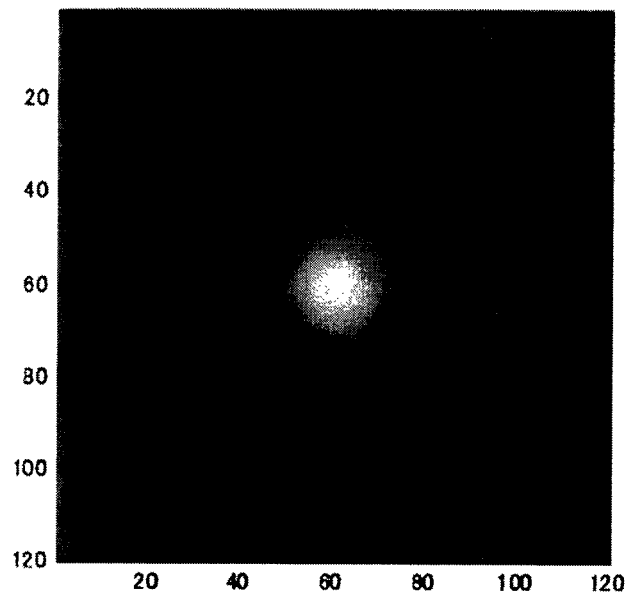
FIG. 13A is an image showing a simulation result showing a light diffusing state in the light-diffusing plate of FIG. 6 when a light source has one light.
Figure 13B:
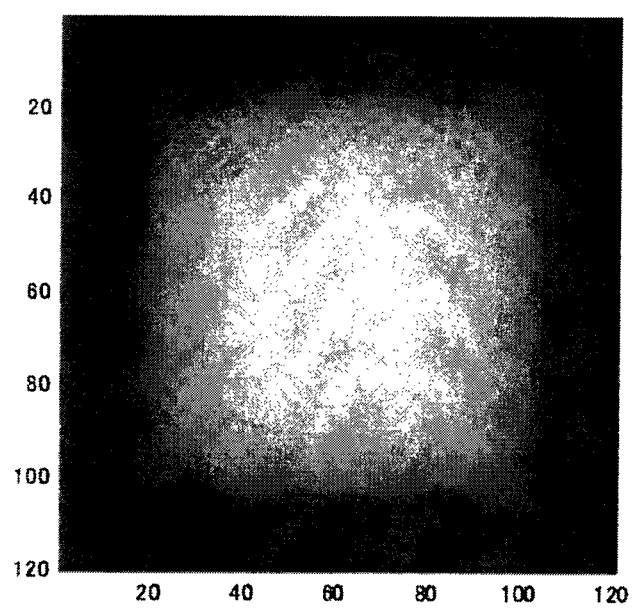
FIG. 13B is an image showing a simulation result showing a light diffusing state in the light-diffusing plate of FIG. 6 when the light source has 25 lights.
Figure 13C:
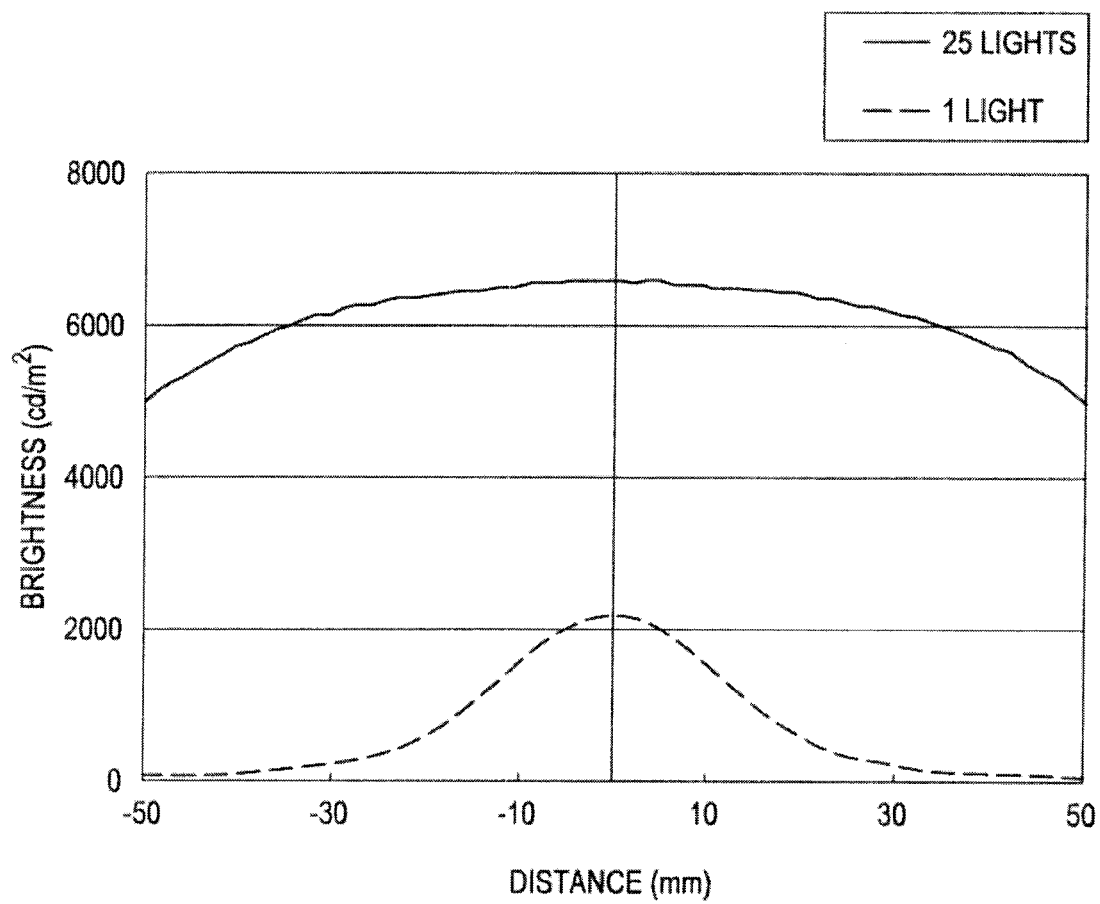
FIG. 13C is a graph showing a simulation result of brightness distribution in the light-diffusing plate of FIG. 6.
Figure 14A:
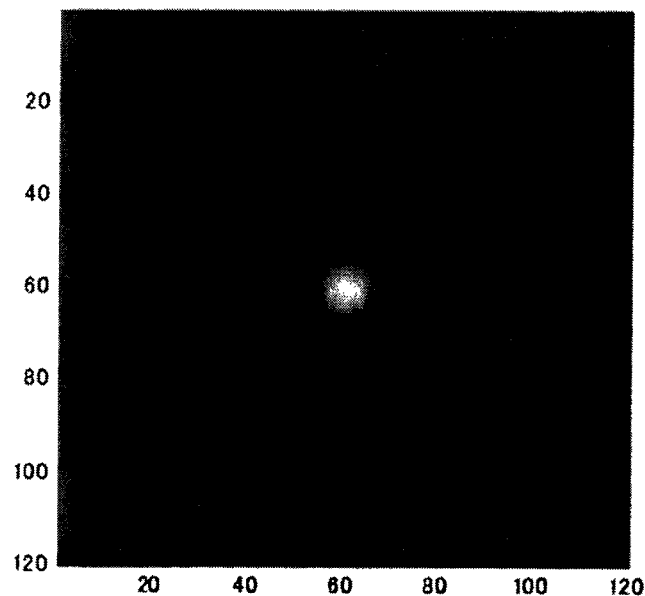
FIG. 14A is an image showing a simulation result showing a light diffusing state in the light-diffusing plate of FIG. 7 when a light source has one light.
Figure 14B:
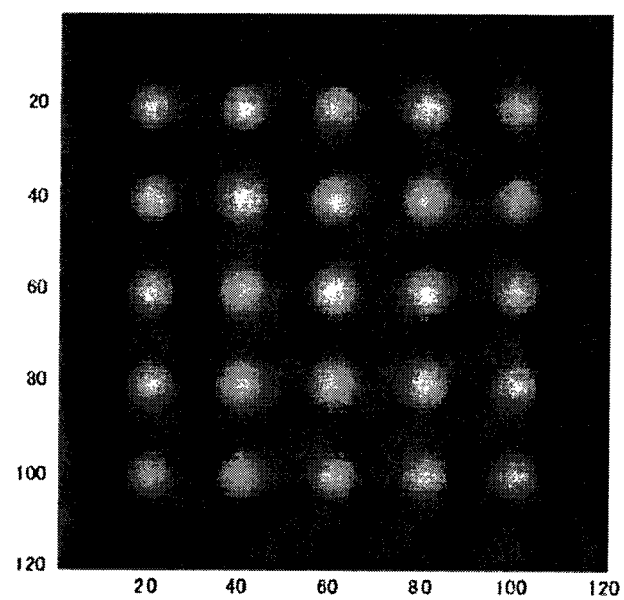
FIG. 14B is an image showing a simulation result showing a light diffusing state in the light-diffusing plate of FIG. 7 when the light source has 25 lights.
Figure 14C:
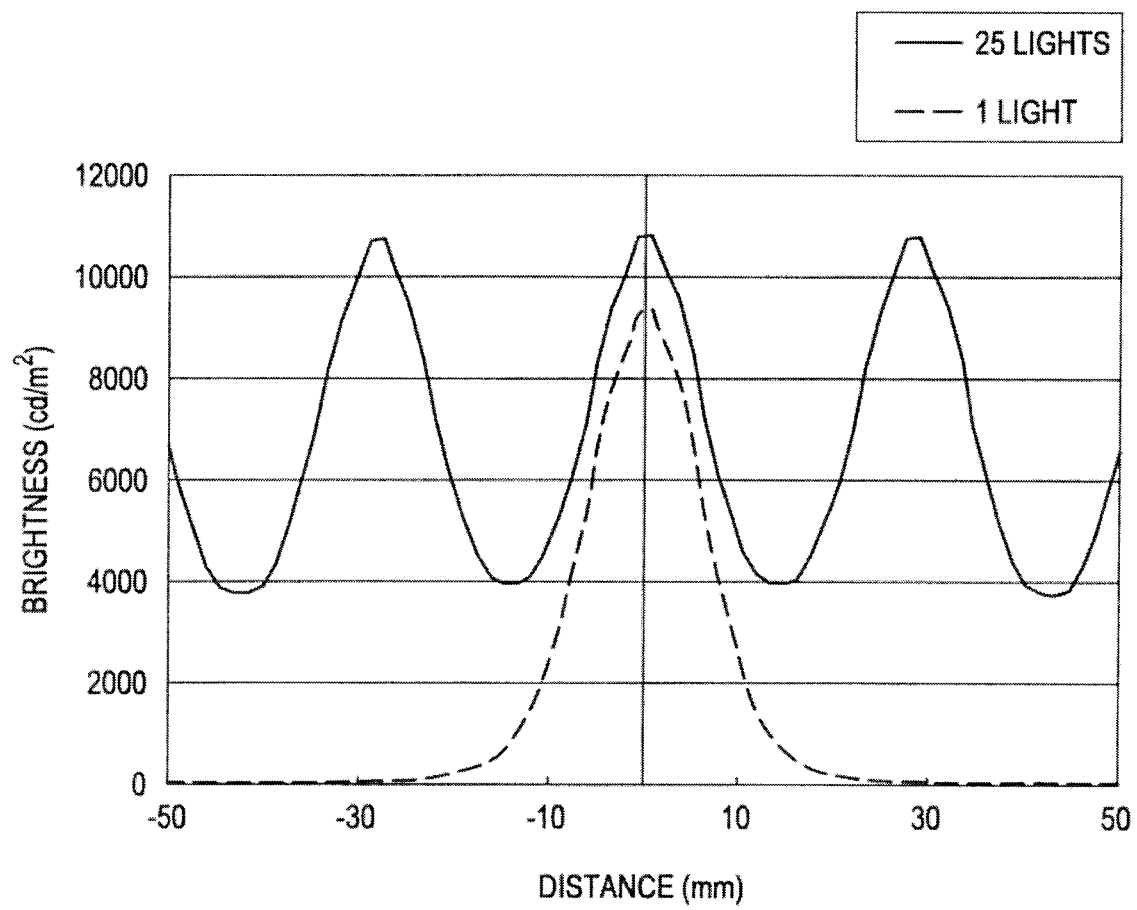
FIG. 14C is a graph showing a simulation result of brightness distribution in the light-diffusing plate of FIG. 7.
Figure 15A:
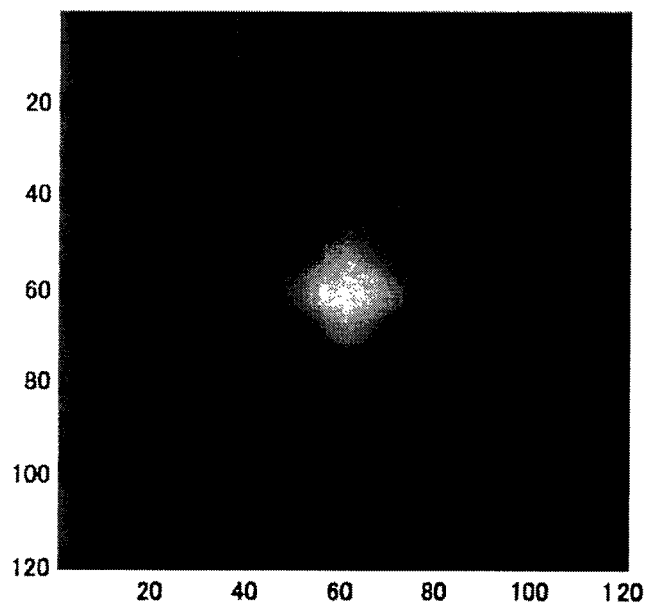
FIG. 15A is an image showing a simulation result showing a light diffusing state in the light-diffusing plate of FIG. 8 when a light source has one light.
Figure 15B:
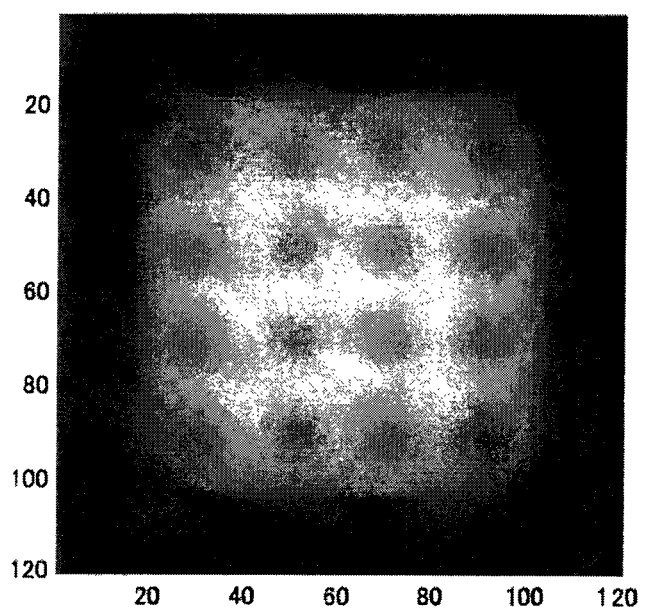
FIG. 15B is an image showing a simulation result showing a light diffusing state in the light-diffusing plate of FIG. 8 when the light source has 25 lights.
Figure 15C:
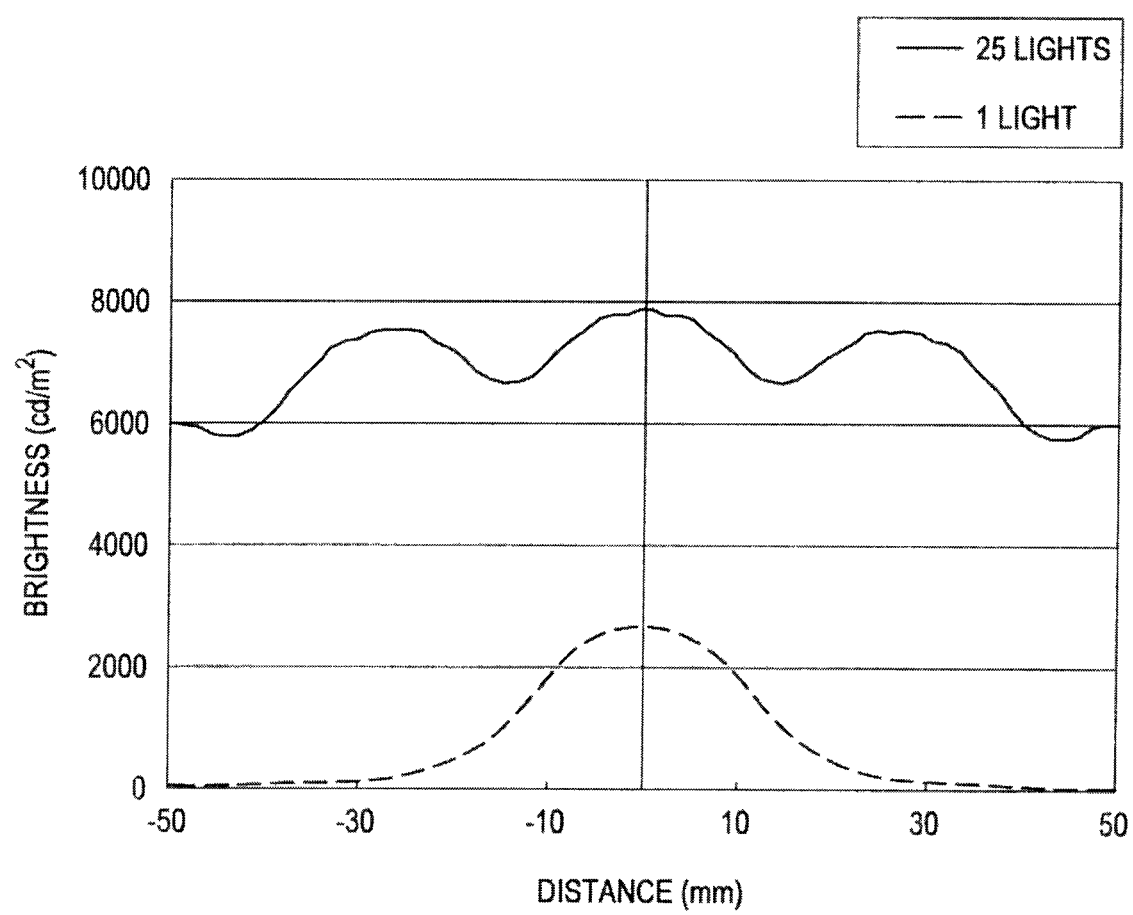
FIG. 15C is a graph showing a simulation result of brightness distribution in the light-diffusing plate of FIG. 8.
Figure 16A:
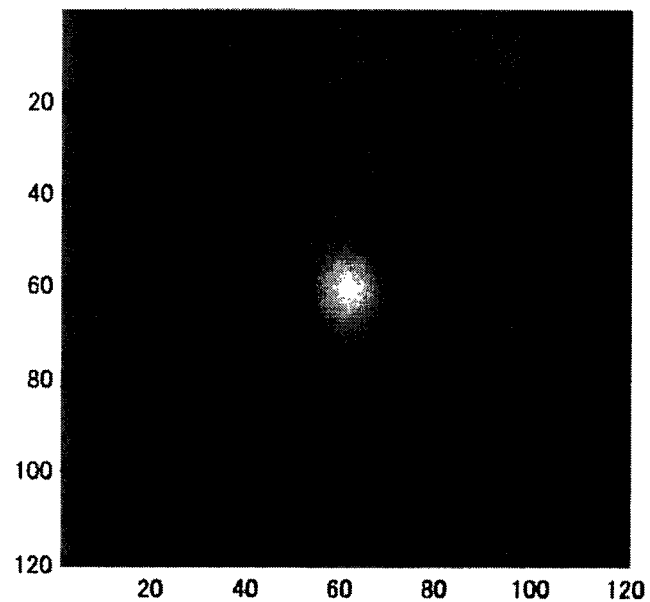
FIG. 16A is an image showing a simulation result showing a light diffusing state in the light-diffusing plate of FIG. 9 when a light source has one light.
Figure 16B:
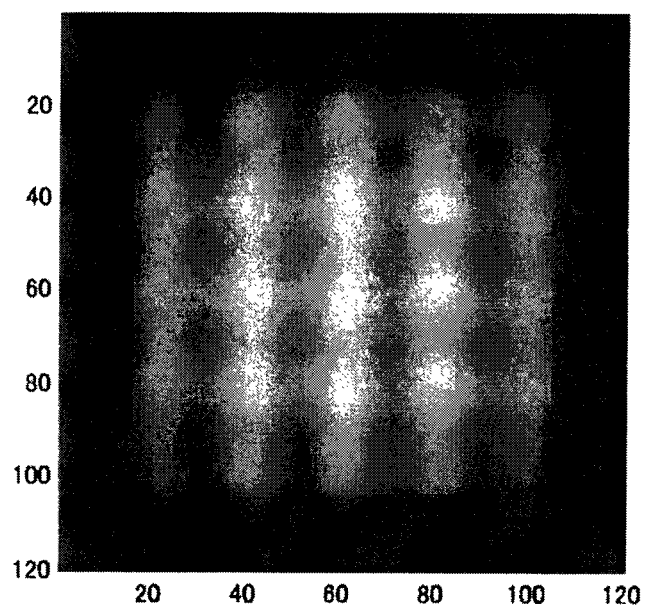
FIG. 16B is an image showing a simulation result showing a light diffusing state in the light-diffusing plate of FIG. 9 when the light source has 25 lights.
Figure 16C:
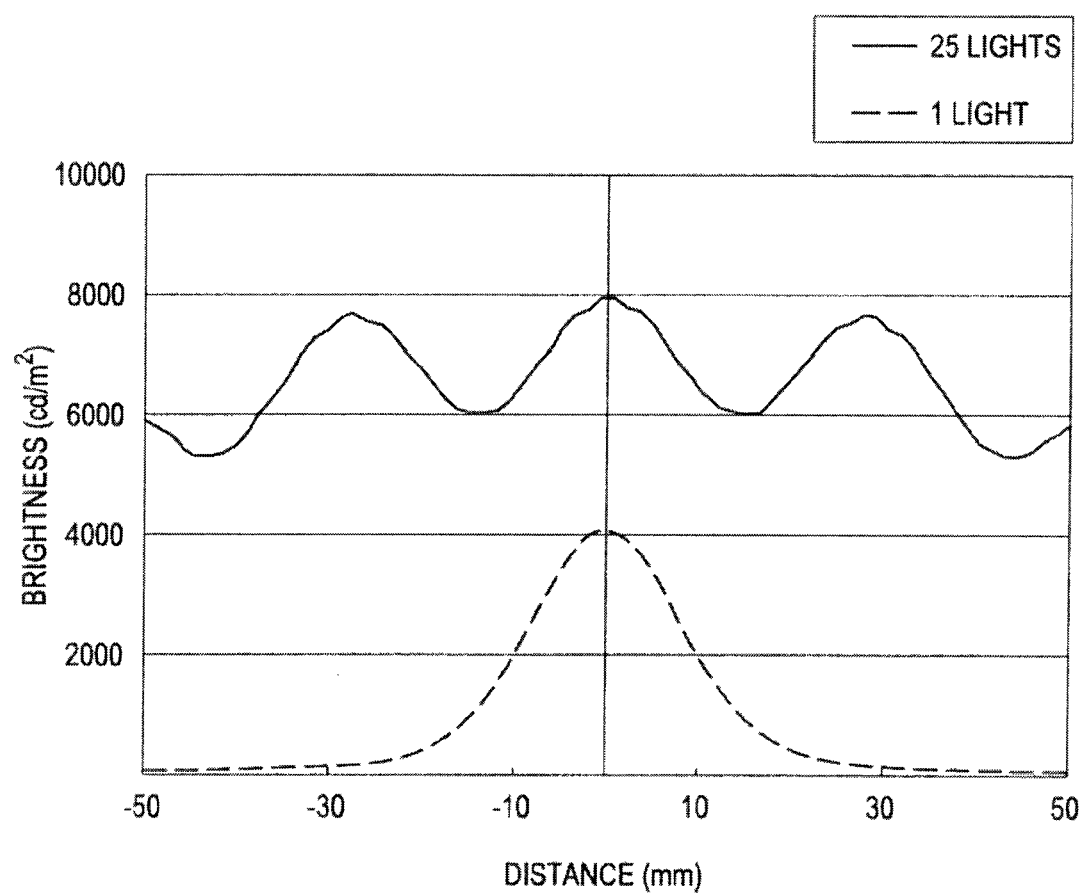
FIG. 16C is a graph showing a simulation result of brightness distribution in the light-diffusing plate of FIG. 9.
Figure 17A:
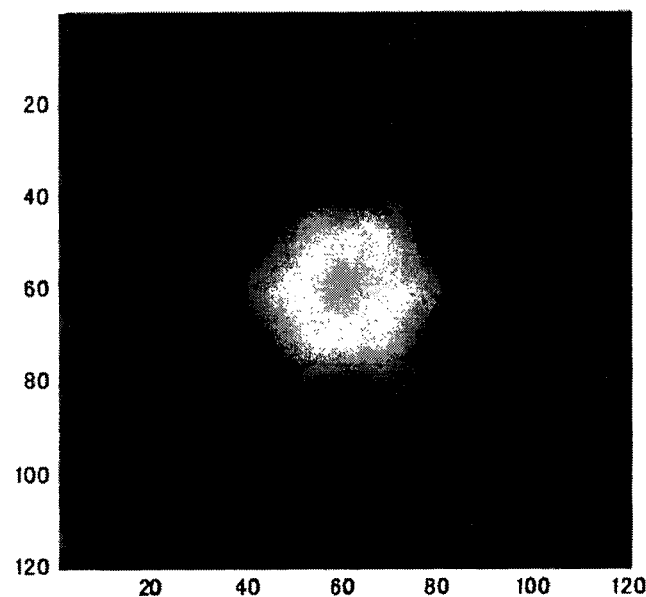
FIG. 17A is an image showing a simulation result showing a light diffusing state in the light-diffusing plate of FIG. 10 when a light source has one light.
Figure 17B:
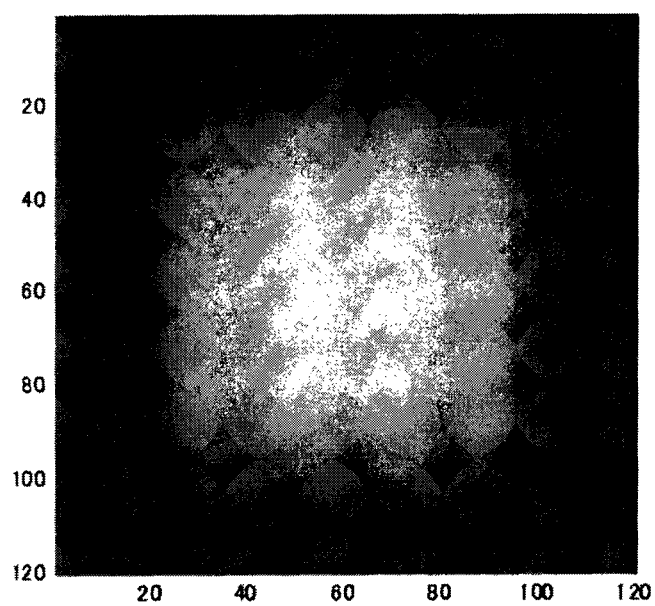
FIG. 17B is an image showing a simulation result showing a light diffusing state in the light-diffusing plate of FIG. 10 when the light source has 25 lights.
Figure 17C:
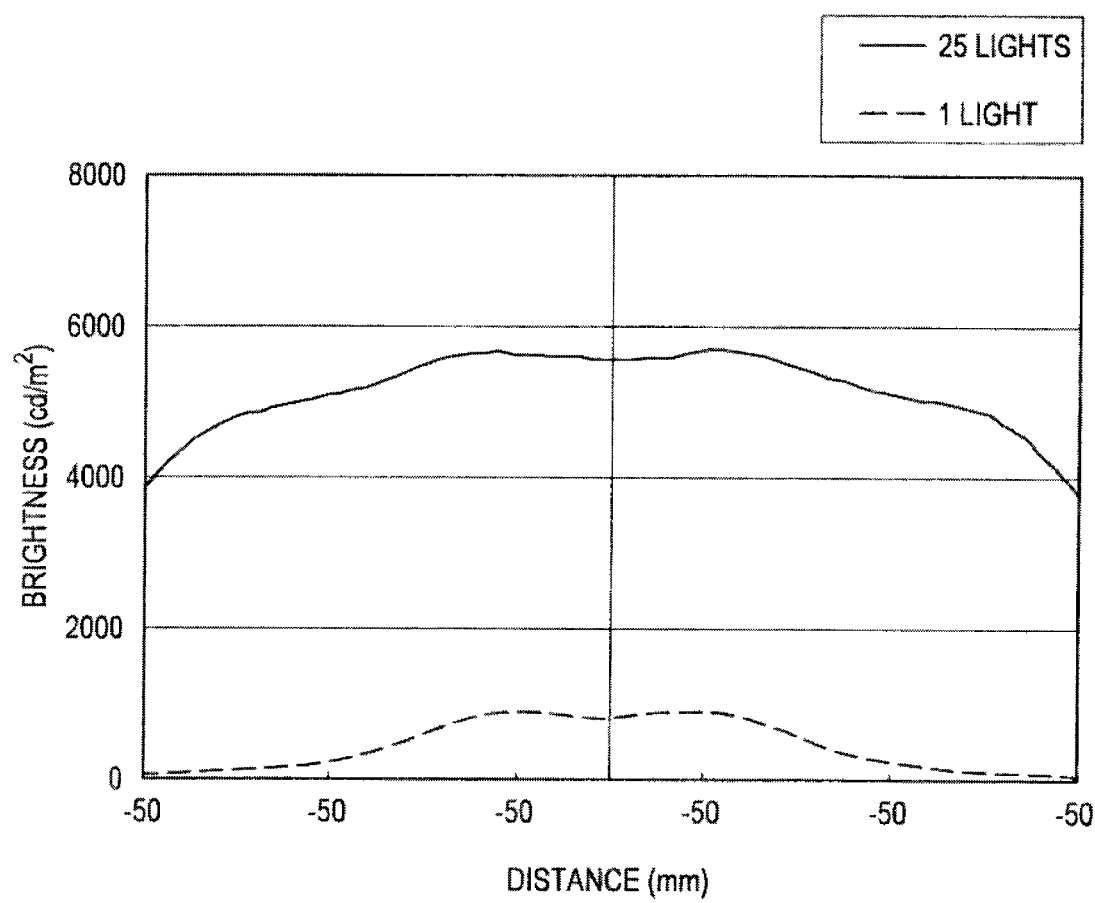
FIG. 17C is a graph showing a simulation result of brightness distribution in the light-diffusing plate of FIG. 10.

FIGS. 7 to 10 are explanatory views showing the constitutions of the related art light-diffusing plates 10, 20, 30, and 40. FIG. 11 is an explanatory view for explaining simulation conditions. FIGS. 12A to 12C are images and graphs showing the simulation result obtained from the light-diffusing plate 150 according to the present embodiment. FIGS. 13A to 13C are images and graphs showing the simulation result obtained from another light-diffusing plate 250 according to the present embodiment. FIGS. 14A to 14C are images and graphs showing the simulation result obtained from the light-diffusing plate 10 of FIG. 7. FIGS. 15A to 15C are images and graphs showing the simulation result obtained from the light-diffusing plate 20 of FIG. 8. FIGS. 16A to 16C are images and graphs showing the simulation result obtained from the light-diffusing plate 30 of FIG. 9. FIGS. 17A to 17C are images and graphs showing the simulation result obtained from the light-diffusing plate 40 of FIG. 10.

In this simulation, the light diffusion effect obtained from the light-diffusing plate is verified. The light diffusion effects of the light-diffusing plate 150 shown in FIG. 3 and another light-diffusing plate 250 shown in FIG. 6 according to the present embodiment are verified. Meanwhile, the light diffusion effects of the four related art light-diffusing plates shown in FIGS. 7 to 10 are also verified for comparison.

Figure 7:
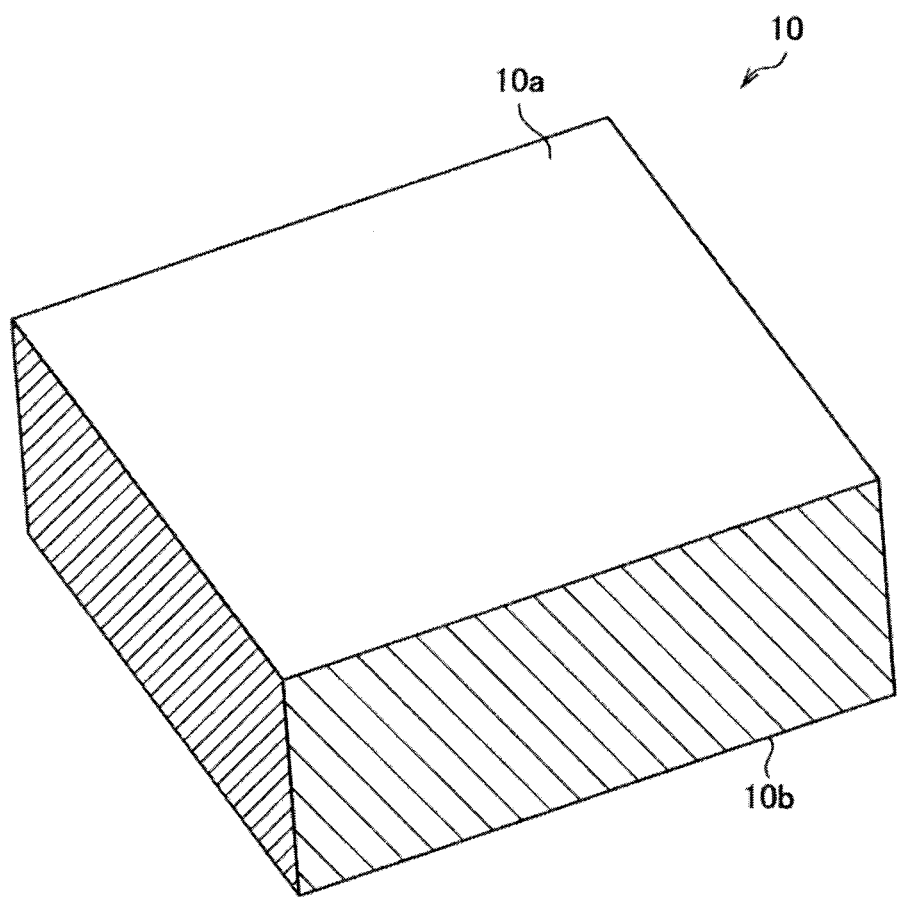
FIG. 7 is an explanatory view showing a constitution of the related art light-diffusing plate.

The light-diffusing plate 10 shown in FIG. 7 has a flat front surface 10*a* and a flat back surface 10*b*. The light-diffusing plate 20 shown in FIG. 8 has a front surface 20*a* with a plurality of recesses 22 and a flat back surface 20*b*. The light-diffusing plate 30 shown in FIG. 9 has a front surface 30*a* with a concavoconvex shape and a flat back surface 30*b*. The concavoconvex shape of the front surface 30*a* is formed by intersection of a linear prism 32 and a linear prism 34. The linear prism 32 has a substantially semicircular cross section vertical to a longitudinal direction extending in a first direction, and the linear prism 34 has an inverted V-shaped cross section vertical to a longitudinal direction extending in a second direction crosswise to the first direction. The light-diffusing plate 40 shown in FIG. 10 has three prism line groups 42, 44, and 46 constituted by arranging a plurality of linear prisms in parallel at a predetermined interval. The linear prisms constituting each prism line group has an inverted V-shaped cross section vertical to the longitudinal direction. The light-diffusing plate 40 is constituted so that each one of the linear prisms (for example, 42*a*, 44*a*, and 46*a*) constituting each of the prism line groups 42, 44, and 46 intersect with an angle of 60° at one intersection where the linear prisms intersect each other.

In this simulation, as shown in FIG. 11, in a state that 25 LEDs as the light sources 134 are arranged in a lattice pattern at a predetermined interval on the circuit board 132, the light is emitted from the LED toward the light-diffusing plate 150 side. The LEDs are arranged at an interval of $w_1$ in a horizontal direction and arranged at an interval of $w_2$ in a vertical direction. Further, the air layer 140 with a distance d is provided from the upper surface of the circuit board 132 on which the LEDs are placed to the back surface of the light-diffusing plate 150. $w_1$, $w_2$, and d may be about 20 mm, for example. In the simulation, the light diffusion state after light is transmitted through the light-diffusing plate in a case where only the central LED of the 25 LEDs is lighted and the light diffusion state after light is transmitted through the light-diffusing plate in a case where the 25 LEDs are lighted are verified. In those cases, a simulation value of the brightness distribution on an A-A line of FIG. 11 is calculated.

[Simulation Result 1: the Light-Diffusing Plate 150 (FIG. 3) According to the Present Embodiment is Used]

FIGS. 12A to 12C show the simulation result of the light-diffusing plate 150 shown in FIG. 3 according to the present embodiment. When only one LED is lighted, as shown in FIG. 12A, the center position is most bright, and the more distant from the center position, it becomes dark. A gradation of brightness is concentrically exhibited. The brightness distribution at that time has a symmetrical hanging bell shape, as shown by the dashed line of FIG. 12C. Next, when all the 25 LEDs are lighted, as shown in FIG. 12B, the central region where 9 LEDs at the central portion are arranged in a square shape has a substantially uniformed brightness, and, as shown by the solid line of FIG. 12C, the light with a high brightness value is emitted. The more distant from the central region, and the closer to the outer circumferential side, the brightness value is reduced, and it becomes dark; however, by virtue of the use of the light-diffusing plate 150, the illumination in a state totally free from brightness unevenness can be realized.

[Simulation Result 2: the Light-Diffusing Plate 250 (FIG. 6) According to the Present Embodiment is Used]

FIGS. 13A to 13C show the simulation result of the light-diffusing plate 250 shown in FIG. 6 according to the present embodiment. When only one LED is lighted. as shown in FIG. 13A, the brightness gradation similar to that in the light-diffusing plate 150 is concentrically exhibited. Namely, the center position is most bright, and the more distant from the center position, it becomes dark. The brightness distribution at that time has a symmetrical hanging bell shape, as shown by the dashed line of FIG. 13C. The brightness at the position corresponding to the central LED is higher than in the case of using the light-diffusing plate 150. Next, when all the 25 LEDs are lighted, as shown in FIG. 13B, the central region where 9 LEDs at the central portion are arranged in a square shape has a substantially uniformed brightness, and, as shown by the solid line of FIG. 13C, the light with a high brightness value is emitted. The more distant from the central region, and the closer to the outer circumferential side, the brightness value is reduced, and it becomes dark; however, by virtue of the use of the light-diffusing plate 250, the illumination in a state totally free from brightness unevenness can be realized as with the light-diffusing plate 150.

[Simulation Result 3: the Related Art Light-Diffusing Plate 10 (FIG. 7) is Used]

FIGS. 14A to 14C show the simulation result of the related art light-diffusing plate 10 shown in FIG. 7. When only one LED is lighted, the brightness gradation shown in FIG. 14A is concentrically exhibited. Namely, the center position of the LED is most bright, and the more distant from the center position, it becomes dark. However, the extent of the brightness gradation is smaller compared with the case of using the light-diffusing plate 150 according to the present embodiment (FIG. 12A). This is because, as seen from the curve shown by the dashed line of FIG. 14C, although the brightness distribution has a symmetric hanging bell shape, the brightness value of the central portion is high, and the more distant from the central portion, the brightness value is rapidly reduced. Namely, it can be shown that the light emitted from the light source 134 is not satisfactorily diffused by the light-diffusing plate 10.

Next, when all the 25 LEDs are lighted, as shown in FIG. 14B, the corresponding position of the LED is remarkably bright, and it is dark between the adjacent LEDs. At that time, as shown by the solid line of FIG. 14C, the brightness value is higher corresponding to the LED located on the straight line AA connecting opposing corners, and the brightness value is lower between the adjacent LEDs. Thus, the brightness value is sinusoidally changed, and brightness unevenness occurs.
[Simulation Result 4: the Related Art Light-Diffusing Plate 20 (FIG. 8) is Used]

Figure 8:
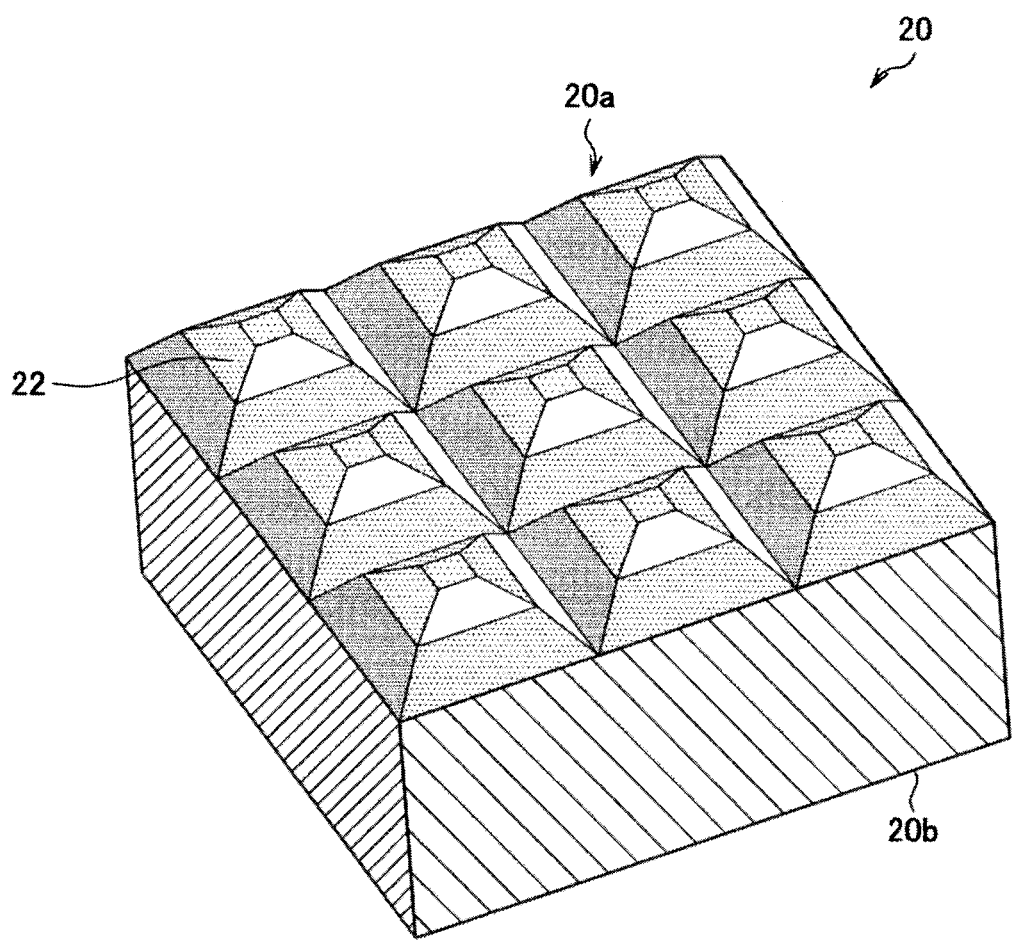
FIG. 8 is an explanatory view showing a constitution of the related art light-diffusing plate.

FIGS. 15A to 15C show the simulation result of the related art light-diffusing plate 20 shown in FIG. 8. When only one LED is lighted, a cross-shaped brightness gradation shown in FIG. 15A is exhibited. Namely, the center position of the LED is most bright, and the more distant from the center position, it becomes dark. Based on the curve shown by the dashed line of FIG. 15C, it can be shown that a symmetric hanging bell-shaped brightness distribution is exhibited, and the light emitted from the LED is diffused, as in the case of using the light-diffusing plate 150 according to the present embodiment, for example.

However, the light emitted from one LED is diffused in a cross shape, and therefore, when all the 25 LEDs are lighted, the lights of the adjacent LEDs each diffused in a cross shape are made continuous with each other, and, as shown in FIG. 15B, a lattice-shaped brightness unevenness occurs. The curve shown by the solid line of FIG. 15C also shows that the brightness value is changed in a wavelike fashion. Thus, the light emitted from a light-emitting unit formed by arranging point light sources like LED may not be uniformly diffused.
[Simulation Result 5: the Related Art Light-Diffusing Plate 30 (FIG. 9) is Used]

Figure 9:
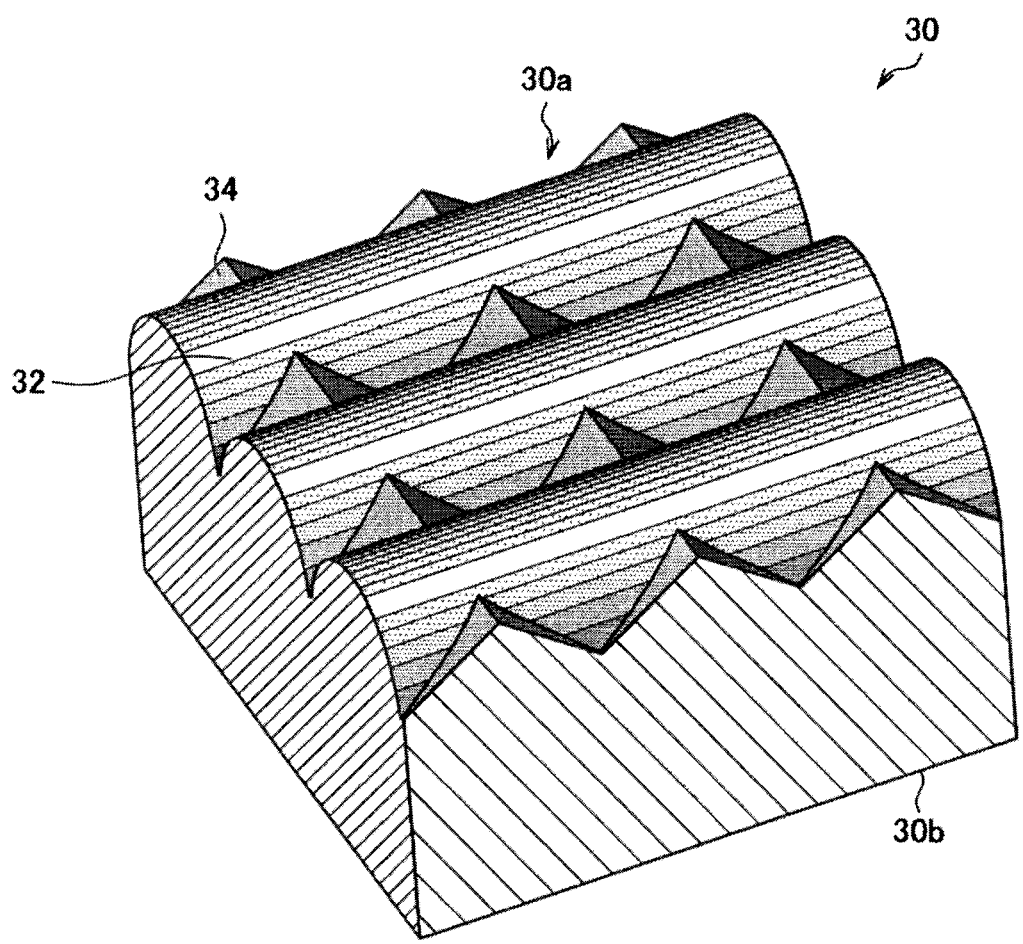
FIG. 9 is an explanatory view showing a constitution of the related art light-diffusing plate.

FIGS. 16A to 16C show the simulation result of the related art light-diffusing plate 30 shown in FIG. 9. When only one LED is lighted, an elliptical brightness gradation shown in FIG. 16A is exhibited. Namely, the center position of the LED is most bright, and the more distant from the center position, it becomes dark. At that time, the extent of the brightness gradation is smaller compared with the case of using the light-diffusing plate 150 according to the present embodiment. This is because, as seen from the curve shown by the dashed line of FIG. 16C, although the symmetric hanging bell-shaped brightness distribution is exhibited, the brightness value of the central portion is high, and the more distant from the central portion, the brightness value is rapidly reduced. Namely, it can be shown that the light emitted from the light source 134 is not satisfactorily diffused by the light-diffusing plate 30.

Next, when all the 25 LEDs are lighted, a lattice-shaped brightness unevenness occurs as shown in FIG. 16B. The curve shown by the solid line of FIG. 16C also shows that the brightness value is changed in a wavelike fashion. The brightness in the vertical direction is higher than the brightness in the horizontal direction of FIG. 16B. This is because, as shown in FIG. 9, the light diffusion effect obtained from the linear prism 32, which extends in the horizontal direction and has a semicircular cross section, is high, and the light diffusion effect obtained from the linear prism 34, which extends in the vertical direction and has an inverted V-shaped cross section, is low. Thus, in the light-diffusing plate 30, the light emitted from the light-emitting unit formed by arranging point light sources like LED may not be uniformly diffused.
[Simulation Result 6: the Related Art Light-Diffusing Plate 40 (FIG. 10) is Used]

Figure 10:
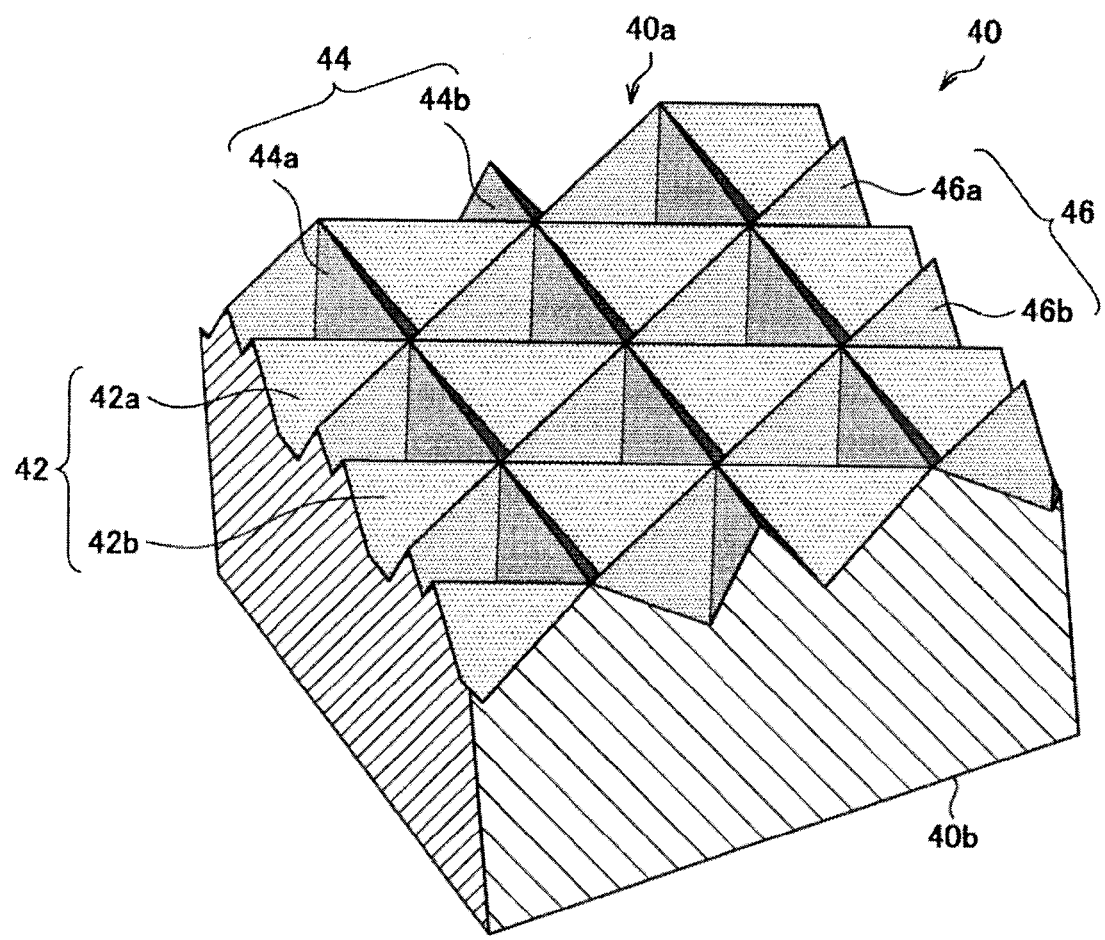
FIG. 10 is an explanatory view showing a constitution of the related art light-diffusing plate.

FIGS. 17A to 17C show the simulation result of the related art light-diffusing plate 40 shown in FIG. 10. The light-diffusing plate 40 is different from the light-diffusing plate 150, according to the present embodiment, in that the linear prism has an inverted V-shaped cross section. When only one LED is lighted, substantially a hexagonally shaped brightness gradation shown in FIG. 17A is exhibited. Namely, the center position of the LED is most bright, and the more distant from the center position, it becomes dark. Although the light-diffusing plate 40 has a high light diffusion effect as shown by the dashed line of FIG. 17C, the brightness value is the highest at two positions slightly far from the center position.

However, when all the 25 LEDs are lighted, a streaky brightness unevenness occurs as shown in FIG. 17B. Based on the curve shown by the solid line of FIG. 17C, it can be shown that although a wave-shaped brightness distribution is not exhibited, the brightness value is not constant as a whole, corresponding to the brightness distribution of the light diffused by one LED. Thus, the light-diffusing plate 40 may not uniformly diffuse the light emitted from the light-emitting unit formed by arranging point light sources like LED.

Based on the above results, it can be shown that by virtue of the use of the light-diffusing plates 150 and 250 according to the present embodiment, the light emitted from the light-emitting unit formed by arranging point light sources can be uniformly diffused compared with the case of using the related art light-diffusing plates 10, 20, 30, and 40.

The display device 100 according to the present embodiment has been described. According to the present embodiment, in the light-diffusing plate 150, the prism line groups having the linear prisms 155 arranged in parallel are formed in three directions, and each one of the linear prisms 155 of the prism line groups intersect at one intersection 158. The projecting shape of the linear prism 155 is formed from at least three surfaces, and consequently the light diffusion effect obtained from one linear prism 155 can be enhanced.

It should be understood by those skilled in the art that various modifications, combinations, sub-combinations and alterations may occur depending on design requirements and other factors insofar as they are within the scope of the appended claims or the equivalents thereof.

For example, in the above embodiment, the linear prism 155 has a multifaceted projecting shape; however, the present invention is not limited to this example, and the linear prism 155 may be a curved surface, for example. In that case, as shown in FIG. 5, the curved surface is sectioned at an arbitrary interval from the center position 156 (for example, $A_1, A_2, A_3, A_4$, and $A_5$). The incident angle θn is determined based on a position where the gradient of a tangent on the sectioned curve is an average value. The projecting shape is formed so that based on the assignment region $S_n$ and the expected beam $F_n$ represented by the formulae (1) and (2), the more distant from the center position, the smaller the expected beam per a unit area ($F_n/S_n$). The linear prisms formed thus are arranged as in FIG. 3, for example, and consequently, a similar effect of enhancing the uniformity of brightness can be provided.

In the above embodiment, the light source 134 of the light-emitting unit 130 is constituted by arranging a plurality of LEDs in a lattice pattern; however, the present invention is not limited to this example. For example, a linear light source such as a cold cathode fluorescent lamp and a hot cathode fluorescent lamp may be used.

The present application contains subject matter related to that disclosed in Japanese Priority Patent Application JP 2009-006084 filed in the Japan Patent Office on Jan. 14, 2009, the entire content of which is hereby incorporated by reference.

What is claimed is:

1. A light control member, comprising:
a plate-like member configured to diffuse light emitted from at least one light source, the plate-like member including
a first flat surface configured to receive the light, and
a second surface configured to diffuse the light, the second surface being facing the first surface and having at least three prism line groups, each group including a plurality of substantially parallel linear prisms;
wherein each one of the linear prisms of one prism line group intersect the linear prisms of other prism line groups at one intersection point, and each linear prism is formed into a convex shape having a generally curved outer edge when viewed along its longitudinal direction; and
an optical sheet provided on the second surface, the optical sheet comprising a laminate of sheets configured to refract the light emitted from the linear prisms, wherein the refracted light travels in a substantially same direction, and a polarization direction conversion sheet configured to convert the polarization direction of the light emitted from the linear prisms.

2. The light control member according to claim 1, wherein the linear prism has at least four surfaces, which are connected so that the adjacent surfaces form an obtuse angle.

3. The light control member according to claim 1, wherein the prism line groups are arranged equiangularly around the intersection point.

4. The light control member according to claim 1, wherein each linear prism is formed into a convex shape having a curved outer edge when viewed along its longitudinal direction.

5. The light control member according to claim 1, wherein, with regard to light emitted from the linear prism, when the outer edge of the linear prism is sectioned at an arbitrary interval in a direction vertical to the first surface, the more distant a section is from a center position where the linear prism projects the most, the less bright the light emitted from the section is.

6. The light control member according to claim 5, wherein in the linear prism, the more distant the section is from the center position, the smaller the number of beams per a unit area in the section, wherein the number of beams per a unit area is equal to Fn/Sn, and $$S_n = ((L_{n+1} - L_n)/2)^2 - ((L_n - L_{n-1})/2)^2 \quad (1)$$

$$F_n = B_n \times \cos\theta_n \times I(\theta_n) \times T(\theta_n) \quad (2),$$

wherein $B_n$ is a virtual area that is really visually confirmed, $\theta_n$ is an incident angle for emitting light toward a direction of a normal line of the second surface, $I(\theta_n)$ is the light intensity of the light source at $\theta_n$, $T(\theta_n)$ is the light transmittance of the light control member at $\theta_n$, $L_n = \tan\theta_n$, $L_1 - L_0 = 0$, and n is an integer.

7. A light-emitting device, comprising:
a light source emitting light;
a light control member configured to diffuse the light emitted from the light source,
wherein the light control member comprises
a plate-like member including
a first flat surface configured to receive the light, and
a second surface configured to diffuse the light, the second surface being facing the first surface and having at least three prism line groups, each group including a plurality of substantially parallel linear prisms;
wherein each one of the linear prisms of one prism line group intersect the linear prisms of other prism line groups at one intersection point, and each linear prism is formed into a convex shape having a generally curved outer edge when viewed along its longitudinal direction; and
an optical sheet provided on the second surface, the optical sheet comprising a laminate of sheets configured to refract the light emitted from the linear prisms, wherein the refracted light travels in a substantially same direction, and a polarization direction conversion sheet configured to convert the polarization direction of the light emitted from the linear prisms.

8. The light-emitting device according to claim 7, wherein the light source comprises a plurality of point light sources arranged in a lattice pattern with a predetermined interval, and each point light source emits light in a direction substantially vertical to the light control member.

9. The light-emitting device according to claim 7, wherein an air layer is provided between the light source and the light control member.

10. A display device comprising:
a display panel on which an image is displayed; and
a light-emitting device illuminating the display panel from the back surface,
wherein the light-emitting device includes a light source emitting light and a light control member configured to diffuse the light emitted from the light source,
wherein the light control member comprises
a plate-like member including
a first flat surface configured to receive the light, and
a second surface configured to diffuse the light, the second surface being facing the first surface and having at least three prism line groups, each group including a plurality of substantially parallel linear prisms;
wherein each one of the linear prisms of one prism line group intersect the linear prisms of other prism line groups at one intersection point, and each linear prism is formed into a convex shape having a generally curved outer edge when viewed along its longitudinal direction; and
an optical sheet provided on the second surface, the optical sheet comprising a laminate of sheets configured to refract the light emitted from the linear prisms, wherein the refracted light travels in a substantially same direction, and a polarization direction conversion sheet configured to convert the polarization direction of the light emitted from the linear prisms.

* * * * *